(12) United States Patent
Ko et al.

(10) Patent No.: US 9,858,930 B2
(45) Date of Patent: Jan. 2, 2018

(54) ELECTRONIC DEVICE AND AUDIO CONVERTING METHOD THEREOF

(71) Applicant: Samsung Electronics Co., Ltd., Gyeonggi-do (KR)

(72) Inventors: Hanho Ko, Gyeonggi-do (KR); Namil Lee, Gyeonggi-do (KR); Sunghoon Kim, Gyeonggi-do (KR); Sohae Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/161,771

(22) Filed: May 23, 2016

(65) Prior Publication Data
US 2016/0379642 A1 Dec. 29, 2016

(30) Foreign Application Priority Data

Jun. 26, 2015 (KR) ........................ 10-2015-0091339

(51) Int. Cl.
| | |
|---|---|
| *G10L 15/00* | (2013.01) |
| *G10L 15/28* | (2013.01) |
| *H04W 52/02* | (2009.01) |
| *G10L 21/0364* | (2013.01) |
| *H04M 1/725* | (2006.01) |
| *G10L 15/22* | (2006.01) |

(52) U.S. Cl.
CPC ........ *G10L 15/285* (2013.01); *G10L 21/0364* (2013.01); *H04M 1/72569* (2013.01); *H04W 52/0264* (2013.01); *G10L 2015/223* (2013.01); *G10L 2015/228* (2013.01); *H04M 2250/74* (2013.01); *Y02B 60/50* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 3,972,020 A | 7/1976 | Carroll et al. | |
| 6,362,681 B1 | 3/2002 | Bollati et al. | |
| 6,433,712 B1 | 8/2002 | Ohnhaeuser et al. | |
| 6,492,840 B1 | 12/2002 | Bellaouar | |
| 6,539,358 B1 * | 3/2003 | Coon | B60R 11/0241 704/251 |
| 6,925,171 B2 | 8/2005 | Wang et al. | |
| 7,085,088 B2 | 8/2006 | Choi | |
| 7,167,047 B2 | 1/2007 | Botti et al. | |
| 7,230,482 B2 | 6/2007 | Chelli et al. | |
| 7,583,122 B2 | 9/2009 | Ronchi et al. | |
| 7,652,528 B2 | 1/2010 | Ballarin et al. | |
| 7,677,099 B2 | 3/2010 | Nasiri et al. | |
| 7,813,515 B2 | 10/2010 | Botti et al. | |
| 7,889,001 B2 | 2/2011 | Hester | |
| 8,099,127 B2 | 1/2012 | Narathong et al. | |
| 8,189,802 B2 | 5/2012 | Miao et al. | |

(Continued)

*Primary Examiner* — Jesse Pullias
(74) *Attorney, Agent, or Firm* — The Farrell Law Firm, P.C.

(57) ABSTRACT

An electronic device and an audio converting method thereof are provided. The method includes determining state information of the electronic device, receiving or outputting an audio signal based on a first mode, when the state information is first state information, and receiving or outputting the audio signal based on a second mode, when the state information is second state information.

20 Claims, 15 Drawing Sheets

(56) References Cited

U.S. PATENT DOCUMENTS

| | | | |
|---|---|---|---|
| 8,296,142 B2* | 10/2012 | Lloyd | H04M 1/04 |
| | | | 704/231 |
| 8,369,534 B2 | 2/2013 | Johnson et al. | |
| 8,890,608 B2 | 11/2014 | Sahandiesfanjani et al. | |
| 8,897,467 B2 | 11/2014 | Murin et al. | |
| 2007/0026844 A1* | 2/2007 | Watanabe | H04M 19/041 |
| | | | 455/412.1 |
| 2007/0192109 A1* | 8/2007 | Likens | G10L 15/26 |
| | | | 704/275 |
| 2011/0188604 A1 | 8/2011 | Wagner | |
| 2012/0208473 A1 | 8/2012 | Aparin | |
| 2013/0051582 A1 | 2/2013 | Kropfitsch et al. | |
| 2013/0085755 A1* | 4/2013 | Bringert | G10L 15/28 |
| | | | 704/235 |
| 2014/0222436 A1* | 8/2014 | Binder | G06F 3/167 |
| | | | 704/275 |

\* cited by examiner

ELECTRONIC DEVICE AND AUDIO CONVERTING METHOD THEREOF

PRIORITY

This application claims priority under 35 U.S.C. §119(a) to Korean Patent Application Serial No. 10-2015-0091339, which was filed in the Korean Intellectual Property Office on Jun. 26, 2015, the entire content of which is incorporated herein by reference.

BACKGROUND

1. Field of the Disclosure

The present disclosure generally relates to an electronic device, and more particularly to an audio converting method in an electronic device.

2. Description of the Related Art

An electronic device may execute a function of transmitting or receiving an audio signal. For example, the function may include a call function, a message exchanging function, an image capturing function, a recording function, a touch control function, an audio control function, and the like.

An electronic device may include an audio receiving unit that receives an audio signal that may be used for executing a function of the electronic device. For example, the electronic device may execute a recording function, and may store an audio signal. Alternatively, the electronic device may execute an audio control function, and may control different functions based on an audio signal. For example, the audio receiving unit may be a microphone.

An electronic device for receiving a high-quality audio signal may expend a great amount of current to execute an audio signal receiving function. Therefore, the efficiency of operations of the electronic device may deteriorate. For example, when the power capacity of the electronic device is insufficient, and the function of receiving an audio signal and the function of providing an image are simultaneously executed in the electronic device, a large amount of power is required to execute the function of receiving an audio signal. Consequently, it is difficult to execute the function of simultaneously providing the image.

For an electronic device receiving a low-quality audio signal, an amount of power used by the electronic device to drive the function of receiving an audio signal may be lower than the power required by the electronic device for receiving a high-quality audio signal, but the quality of the audio signal received by the electronic device may be low. Accordingly, the electronic device is not capable of receiving a high-quality audio signal, and thus, it may be difficult to execute an application that requires a high-quality audio signal. For example, when a voice recognition application is executed in the electronic device for receiving a low-quality audio signal, the electronic device may have difficulty in recognizing a voice because the quality of the received voice signal is low.

SUMMARY

An aspect of the present disclosure is to provide an electronic device and a method thereof, which selectively receive a high-quality audio signal or a low-quality audio signal, based on a state of the electronic device or an application executed in the electronic device. Therefore, the efficiency of operations of the electronic device may be improved.

According to an aspect of the present disclosure, there is provided an audio converting method of an electronic device, the method includes determining state information of the electronic device, receiving or outputting an audio signal based on a first mode, when the state information is first state information, and receiving or outputting the audio signal based on a second mode, when the state information is second state information.

According to another aspect of the present disclosure, there is provided an electronic device, including an audio converting unit to receive or output an audio signal, and a processor configured to determine state information of the electronic device or an application executed in the electronic device, and control the audio converting to receive or output the audio signal based on a differential mode, when the state information is first state information, and to receive or output the audio signal based on a single-ended mode, when the state information is second state information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
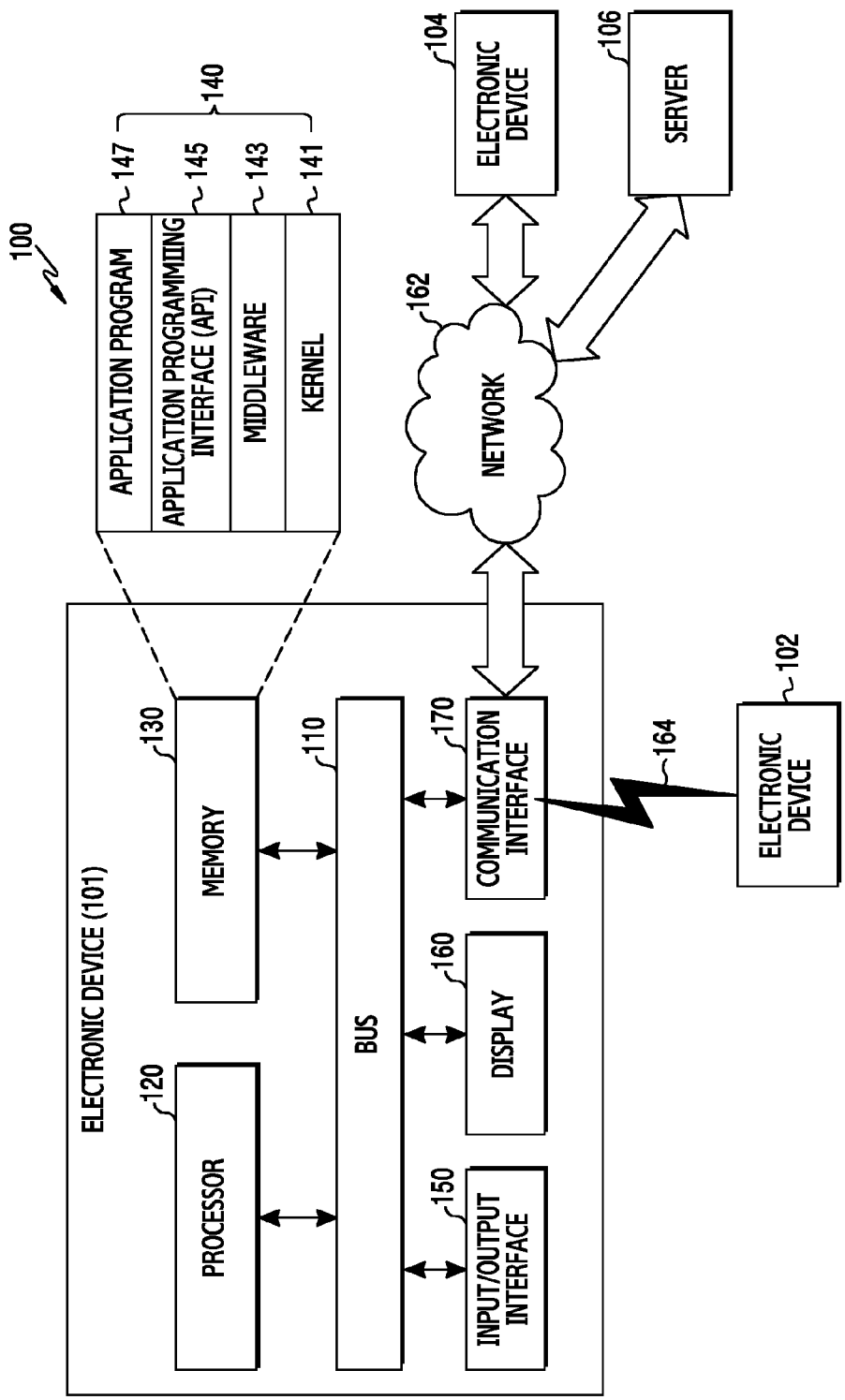
FIG. 1 illustrates an electronic device in a network environment system according to an embodiment of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

The terms and expressions used herein are for the purpose of describing particular embodiments and do not limit the scope of other embodiments. As used herein, singular forms may include plural forms as well, unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined as such in the present disclosure. In some cases, even the terms defined in the present disclosure should not be interpreted to exclude embodiments of the present disclosure.

Herein, the expressions "have", "may have", "include", and "may include" refer to the existence of a corresponding feature (e.g., numeral, function, operation, or constituent element such as component), and do not exclude one or more additional features.

The expressions "A or B", "at least one of A or/and B", or "one or more of A or/and B" may include all possible combinations of the items listed. For example, the expressions "A or B", "at least one of A and B", or "at least one of A or B" refers to all of (1) including at least one A, (2) including at least one B, or (3) including all of at least one A and at least one B.

The expressions "a first", "a second", "the first", or "the second" may modify various components regardless of the order and/or the importance but do not limit the corresponding components. For example, a first user device and a second user device indicate different user devices although both are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., a second element), the first element may be directly connected or coupled to the second element or any other element (e.g., a third element) may be interposed in between. In contrast, when the first element is referred to as being "directly connected," or "directly coupled" to the second element, there are no elements in between.

The expression "configured to" may be interchangeably used with, for example, "suitable for", "having the capacity to", "designed to", "adapted to", "made to", or "capable of" according to context. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

An electronic device according to an embodiment of the present disclosure may include a smart phone, a tablet Personal Computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, eye glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

An electronic device may also be a home appliance, such as a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

An electronic device may also be a medical device (e.g., a portable medical measuring device such as a blood glucose monitoring device, a heart rate monitoring device, a blood pressure measuring device, a body temperature measuring device, etc., a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), point of sales (POS) terminal, or Internet of Things device (e.g., a light bulb, various sensors, electric or gas meter, a sprinkler device, a fire alarm, a thermostat, a streetlamp, a toaster, a sporting good, a hot water tank, a heater, a boiler, etc.).

An electronic device may also include at least one of a part of furniture or a building/structure, an electronic board, an electronic signature receiving device, a projector, and various kinds of measuring instruments (e.g., a water meter, an electric meter, a gas meter, and a radio wave meter).

An electronic device may be a flexible device.

Additionally, an electronic device may be a combination of one or more of the aforementioned various devices.

Further, an electronic device is not limited to the aforementioned devices, and may include a different electronic device or a new electronic device according to the development of new technologies.

Herein, the term "user" may indicate a person who uses an electronic device or a device (e.g., an artificial intelligence electronic device) that uses an electronic device.

FIG. 1 illustrates an electronic device in a network environment system according to an embodiment of the present disclosure.

Referring to FIG. 1, the electronic device 101 includes a bus 110, a processor 120, a memory 130, an input/output interface 150, a display 160, and a communication interface 170. In some embodiments, the electronic device 101 may omit at least one of the above components or may include other components.

The bus 110 may include, for example, a circuit for interconnecting the components 110 to 170, and transferring communication (e.g., control messages and/or data) between the components.

The processor 120 may include one or more of a central processing unit (CPU), an application processor (AP), and a communication processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other component of the electronic device 101. According to an embodiment of the present disclosure, the memory 130 may store software and/or a program 140. The program 140 includes a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage system resources (e.g., the bus 110, the processor 120, the memory 130, and the like) used for performing an operation or function implemented by the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 based on priorities thereof. For example, the middleware 143 may assign priorities for using the system resources (e.g., the bus 110, the processor 120, the memory 130, and the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, text control, and the like.

The input/output interface 150, for example, may function as an interface that transfers instructions or data input from a user or another external device to other component(s) of the electronic device 101. Furthermore, the input/output interface 150 may output instructions or data received from the other component(s) of the electronic device 101 to the user or other external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of content (e.g., text, images, videos, icons, symbols, and the like) for a user. The display 160 may include a touch screen, and may receive, for example, a touch, gesture, proximity, or hovering input by using an electronic pen or a part of the user's body.

The communication interface 170, for example, may control communication between the electronic device 101 and an external device (e.g., a first external electronic device 102, a second external electronic device 104, or a server 106). For example, the communication interface 170 may be connected to a network 162 through wireless or wired communication to communicate with the external device 104 or the server 106.

The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol.

In addition, the wireless communication may include, for example, short range communication 164. The short range communication 164 may include, for example, at least one of wireless fidelity (Wi-Fi), Bluetooth, near field communication (NFC), global navigation satellite system (GNSS), and the like. The GNSS may include at least one of, for example, a global positioning system (GPS), a global navigation satellite system (Glonass), a Beidou navigation satellite system, and Galileo (European global satellite-based navigation system). Hereinafter, the term "GPS" may be interchangeably used with the term "GNSS" in the present disclosure.

The wired communication may include, for example, at least one of a universal serial bus (USB), a high definition multimedia interface (HDMI), recommended standard 232 (RS-232), and a plain old telephone service (POTS).

The network 162 may include at least one of a communication network such as a computer network (e.g., a LAN or a WAN), the Internet, and a telephone network.

Each of the first and second external electronic devices 102 and 104 may be of a type identical to or different from the electronic device 101. According to an embodiment of the present disclosure, the server 106 may include a group of one or more servers. All or some of the operations performed in the electronic device 101 may be performed in another electronic device or a plurality of electronic devices 102, 104, or the server 106. When the electronic device 101 has to perform some functions or services automatically or in response to a request, the electronic device 101 may make a request for performing at least some functions relating thereto to another device 102, 104, or the server 106, instead of, or in addition to, performing the functions or services by itself. Another electronic device 102, 104, or the server 106, may execute the requested functions or the additional functions, and may deliver a result thereof to the electronic device 101. The electronic device 101 may process the received result as it is, or additionally process the result, and provide the requested functions or services. To this end, for example, cloud computing, distributed computing, or client-server computing technology may be used.

Figure 2:
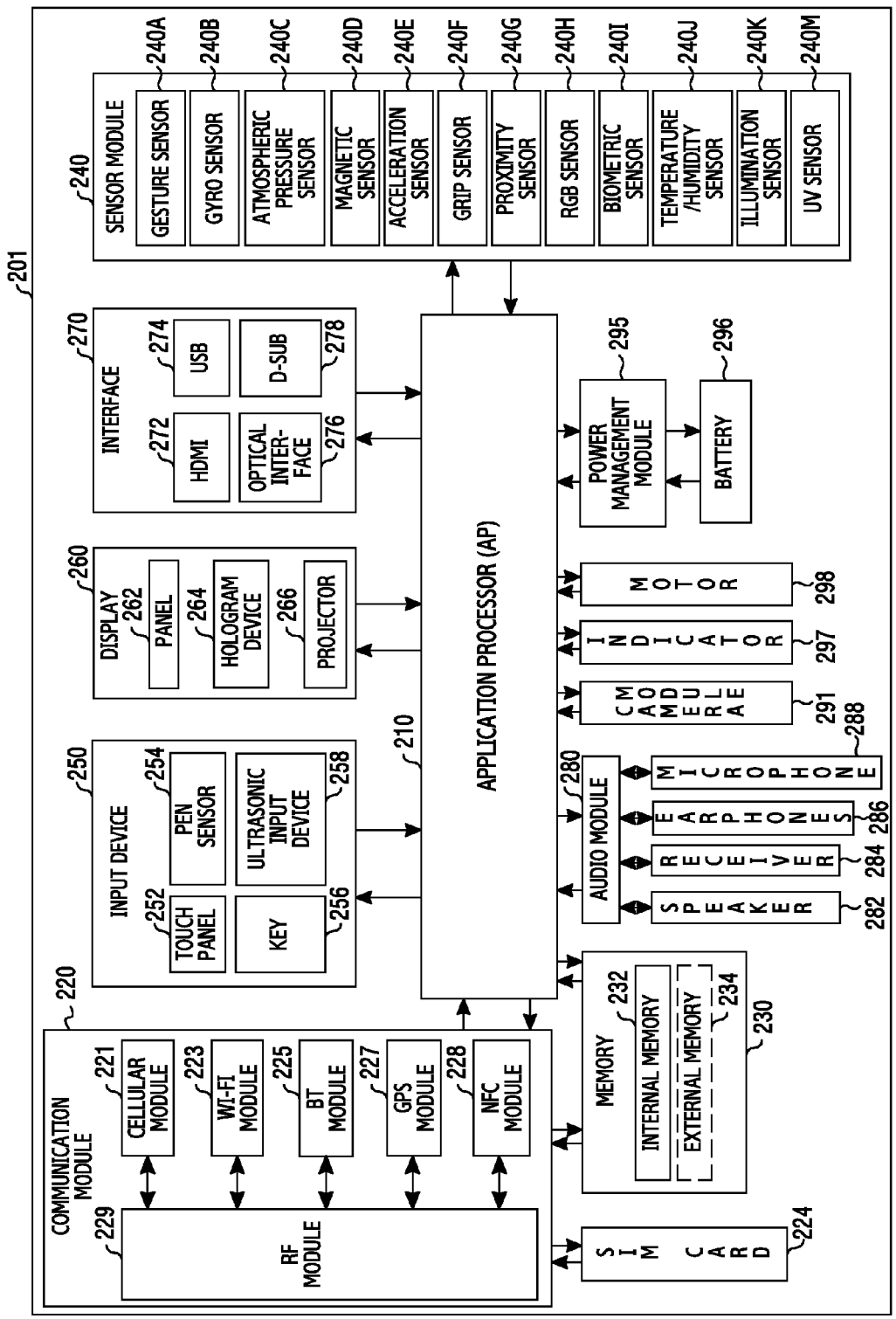
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 includes one or more processors 210 (e.g., application processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and may perform various data processing and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (e.g., a cellular module 221) of the components illustrated in FIG. 2. The processor 210 may load, into a volatile memory, instructions or data received from at least one (e.g., a non-volatile memory) of the other components and may process the loaded instructions or data, and may store various data in a non-volatile memory.

The communication module 220 may have a configuration equal or similar to that of the communication interface 170 of FIG. 1. The communication module 220 includes a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221, for example, may provide a voice call, a video call, a text message service, an Internet access service, and the like, through a communication network. According to an embodiment of the present disclosure, the cellular module 221 may distinguish and authenticate the electronic device 201 in a communication network by using the subscriber identification module 224 (e.g., the SIM card). The cellular module 221 may perform at least some of the functions that the processor 210 may provide. The cellular module 221 may include a communication processor (CP).

The Wi-Fi module 223, the Bluetooth module 225, the GNSS module 227, or the NFC module 228 may include, for example, a processor that processes data transmitted and received through a corresponding module. According to an embodiment of the present disclosure, at least some (two or more) of the cellular module 221, the WiFi module 223, the Bluetooth module 225, the GNSS module 227, and the NFC module 228 may be included in one integrated chip (IC) or IC package.

The RF module 229 may transmit/receive, for example, a communication signal (e.g., an RF signal). The RF module 229 may include, for example, a transceiver, a Power Amp Module (PAM), a frequency filter, a Low Noise Amplifier (LNA), an antenna, and the like. At least one of the cellular module 221, the WiFi module 223, the Bluetooth module 225, the GNSS module 227, and the NFC module 228 may transmit/receive an RF signal through a separate RF module.

The subscriber identification module (SIM) 224 may include a card that includes an embedded SIM, and may contain unique identification information (e.g., an integrated circuit card identifier (ICCID)) or subscriber information (e.g., an international mobile subscriber identity (IMSI)).

The memory 230 includes an embedded memory 232 or an external memory 234. The internal memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a solid state drive (SSD).

An external memory 234 may further include a flash drive, for example, a compact flash (CF), a secure digital (SD), a micro secure digital (Micro-SD), a mini secure digital (Mini-SD), an extreme digital (xD), a multi-media card (MMC), a memory stick, and the like. The external memory 234 may be functionally and/or physically connected to the electronic device 201 through various interfaces.

The sensor module 240, for example, may measure a physical quantity or detect an operation state of the electronic device 201, and may convert the measured or detected information into an electric signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, an RGB sensor 240H (e.g., a red, green, blue (RGB) sensor), a biometric sensor 2401, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. The electronic device 201 may further include a processor configured to control the sensor module 240 as a part of or separately from the processor 210, and may control the sensor module 240 while the processor 210 is in a sleep state.

The input device 250 includes a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to a user.

The (digital) pen sensor 254 may include, for example, a recognition sheet which is a part of a touch panel or is separated from the touch panel. The key 256 may include, for example, a physical button, an optical key or a keypad. The ultrasonic input device 258 may detect ultrasonic waves generated by an input tool through a microphone (e.g., the microphone 288) and determine data corresponding to the detected ultrasonic waves.

The display 260 includes a panel 262, a hologram device 264, or a projector 266. The panel 262 may include a configuration identical or similar to that of the display 160 illustrated in FIG. 1. The panel 262 may be flexible, transparent, or wearable. The panel 262 and the touch panel 252 may be formed as one module. The hologram 264 may show a three dimensional image in the air by using an interference of light. The projector 266 may display an image by projecting light onto a screen. The screen may be located, for example, inside or outside the electronic device 201. The display 260 may further include a control circuit for controlling the panel 262, the hologram device 264, or the projector 266.

The interface 270 includes a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bidirectionally convert, for example, a sound and an electrical signal. At least some components of the audio module 280 may be included in, for example, the input/output interface 150 illustrated in FIG. 1. The audio module 280 may process sound information which is input or output through, for example, a speaker 282, a receiver 284, earphones 286, the microphone 288 and the like.

The camera module 291, for example, is a device which may photograph a still image and a dynamic image. The camera module 291 may include one or more image sensors (e.g., a front sensor or a back sensor), a lens, an image signal processor (ISP), or a flash (e.g., LED or xenon lamp).

The power management module 295 may manage, for example, power of the electronic device 201. The power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature during charging. The battery 296 may include, for example, a rechargeable battery and/or a solar battery.

The indicator 297 may indicate a particular state (e.g., a booting state, a message state, a charging state, and the like) of the electronic device 201 or a part (e.g., the processor 210) of the electronic device 201. The motor 298 may convert an electric signal into mechanical vibration, and may generate vibration, a haptic effect, and the like. The electronic device 201 may include a processing device (e.g., a GPU) for supporting a mobile television (TV). The processing device for supporting a mobile TV, for example, may process media data according to a certain standard such as digital multimedia broadcasting (DMB), digital video broadcasting (DVB), or MediaFlo™.

Each of the above-described component elements of hardware may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the components may be combined into one entity, which may perform functions identical to those of the relevant components before the combination.

Figure 3:
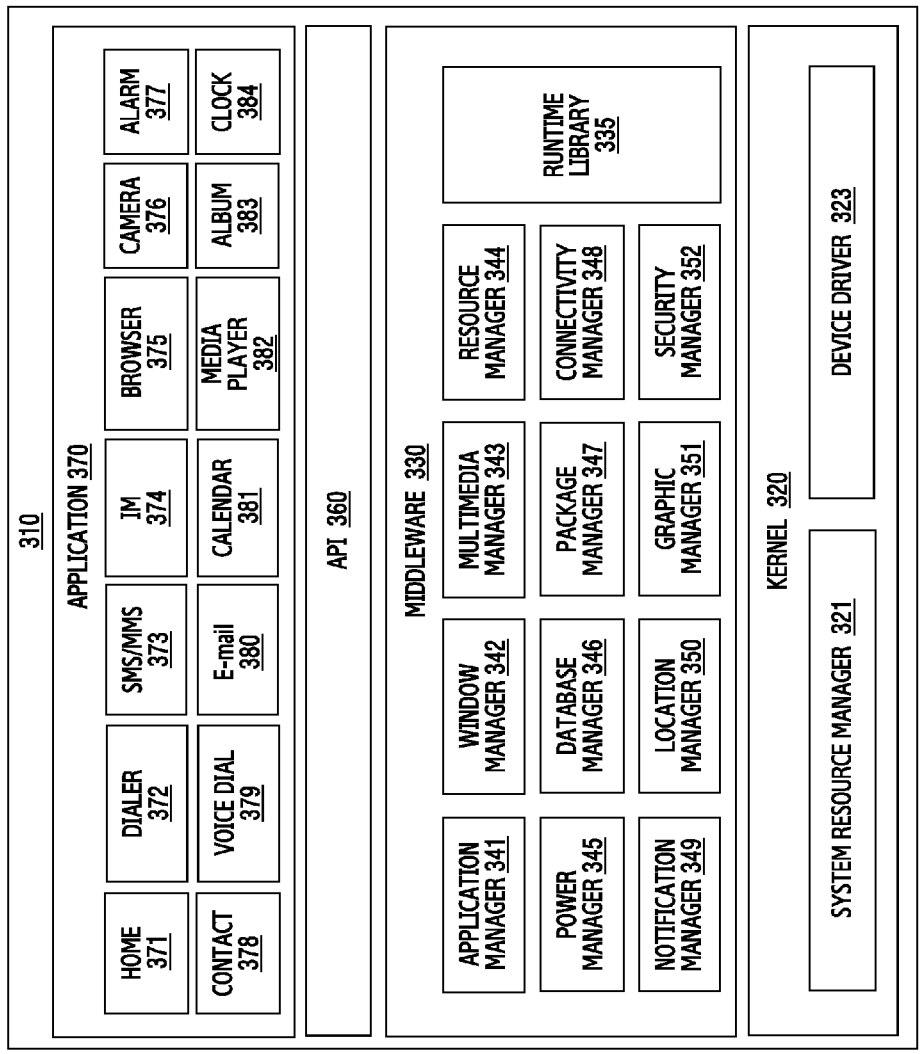
FIG. 3 is a block diagram of a programming module according to an embodiment of the present disclosure.

FIG. 3 is a block diagram of a program module according to an embodiment of the present disclosure.

Referring to FIG. 3, the program module 310 (e.g., the program 140) includes an operating system (OS) for controlling resources related to an electronic device (e.g., the electronic device 101) and/or various applications (e.g., the application programs 147) executed in the operating system. The operating system may be, for example, Android®, iOS®, Windows®, Symbian®, Tizen®, Bada®, and the like.

The program module 310 may include a kernel 320, middleware 330, an application programming interface (API) 360, and/or an application 370. At least some of the program module 310 may be preloaded on the electronic device, or may be downloaded from an external electronic device 102, 104, or the server 106.

The kernel 320 (e.g., the kernel 141) includes a system resource manager 321 and/or a device driver 323. The system resource manager 321 may control, assign, or collect system resources. According to an embodiment of the present disclosure, the system resource manager 321 may include a process manager, a memory manager, a file system manager, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 may efficiently use limited system resources within the electronic device. According to an embodiment of the present disclosure, the middleware 330 (e.g., the middleware 143) includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, a function for an arithmetic function, and the like.

The application manager 341, for example, may manage a life cycle of at least one of the applications 370. The window manager 342 may manage graphical user interface (GUI) resources used on a screen. The multimedia manager 343 may identify formats required for the reproduction of various media files, and encode or decode a media file using a codec suitable for a corresponding format. The resource manager 344 may manage resources of at least one of the applications 370, such as a source code, a memory, a storage space, and the like.

The power manager 345 may operate together with, for example, a basic input/output system (BIOS) to manage a battery or power and may provide power information required for the operation of an electronic device. The database manager 346 may generate, search for, or change a database to be used in at least one of the applications 370. The package manager 347 may manage the installation or the updating of an application distributed in the form of a package file.

The connectivity manager 348 may manage a wireless connection, for example, Wi-Fi or Bluetooth. The notification manager 349 may display or notify of an event, such as an arrival message, an appointment, proximity notification, and the like, in such a manner not to disturb a user. The location manager 350 may manage location information of an electronic device. The graphic manager 351 may manage a graphic effect to be provided to a user and a user interface relating to the graphic effect. The security manager 352 may provide all security functions required for system security, user authentication, and the like. When an electronic device (e.g., the electronic device 101) has a phone call function, the middleware 330 may further include a telephony manager for managing a voice call function or a video call function of the electronic device.

The middleware 330 may include a middleware module that forms combinations of various functions of the above described components. The middleware 330 may provide a module specified for each type of operating system in order to provide a differentiated function. Furthermore, the middleware 330 may dynamically remove some of the existing components, or may add new components. The API 360 (e.g., the API 145), for example, is a set of API programming functions, and may be provided as a different configuration according to an OS. For example, in the case of Android® or iOS®, one API set may be provided for each platform, and in the case of Tizen®, two or more API sets may be provided for each platform.

The applications 370 (e.g., the application programs 147) include one or more applications which provide functions such as home 371, dialer 372, SMS/MMS 373, instant message (IM) 374, browser 375, camera 376, alarm 377, contacts 378, voice dial 379, email 380, calendar 381, media player 382, album 383, clock 384, voice wakeup, voice/video call, audio/video recording, game, voice recognition, personal broadcasting, health care (e.g., measure exercise quantity or blood sugar), environment information (e.g., atmospheric pressure, humidity, or temperature information), and the like.

The applications 370 may include an application (hereinafter, referred to as an "information exchange application") that supports exchanging information between an electronic device (e.g., the electronic device 101) and an external electronic device 102 or 104. The application associated with exchanging information may include, for example, a notification relay application for notifying an external electronic device of certain information or a device management application for managing an external electronic device.

For example, the notification relay application may include a function of transferring, to the external electronic device 102 or 104, notification information generated from other applications of the electronic device (e.g., an SMS/MMS application, an e-mail application, a health management application, or an environmental information application). Further, the notification relay application may receive notification information from, for example, the external electronic device, and provide the received notification information to a user.

For example, the device management application may manage (e.g., install, delete, or update) at least one function of an external electronic device 102 or 104, communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

The applications 370 may include applications (e.g., a health care application of a mobile medical appliance and the like) designated according to attributes of the external electronic device 102 or 104. The application 370 may include an application received from an external electronic device, the server 106, or the electronic device 102 or 104. The applications 370 may include a preloaded application or a third party application which may be downloaded from a server. Names of the elements of the program module 310, according to the above-described embodiments of the present disclosure, may change depending on the type of OS.

At least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
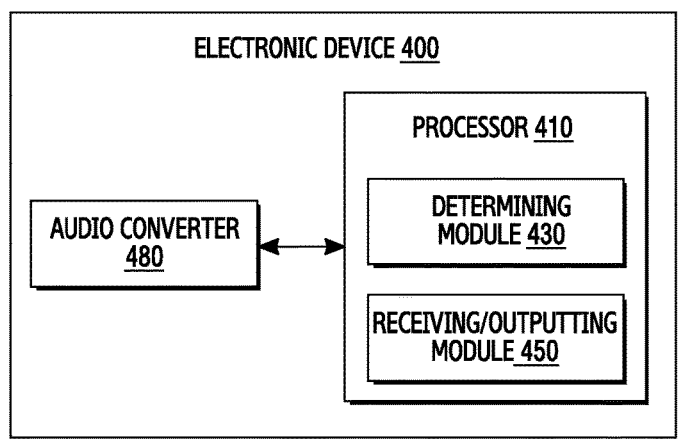
FIG. 4 is a block diagram of an electronic device according to an embodiment of the present disclosure.

FIG. 4 is a block diagram of an electronic device 400 according to an embodiment of the present disclosure.

Referring to FIG. 4, the electronic device 400 includes an audio converter 480 and a processor 410. The audio converter 480 may bidirectionally convert an audio signal and an electric signal. The audio converter 480 may include, for example, at least one of an audio receiving unit and an audio transmitting unit.

The audio receiving unit may receive an audio signal. The audio receiving unit, for example, may detect an audio signal from sound waves. The audio receiving unit may detect an analog audio signal. Sound waves may be generated from sound around the electronic device 400. For example, the sound around the electronic device 400 may include a voice of a user of the electronic device 400. Also, the audio receiving unit may process an audio signal as an electric signal. The audio receiving unit may convert an analog audio signal into a digital audio signal. For example, the audio receiving unit may include a microphone. The microphone may include an electret capacitor microphone (ECM) and a micro electro mechanical system (MEMS) microphone.

The audio transmitting unit may transmit an audio signal. The audio transmitting unit may process an electric signal as an audio signal. The audio transmitting unit may convert a digital audio signal into an analog audio signal. The audio transmitting unit may output an audio signal as sound waves. The audio transmitting unit may generate sound waves from an analog audio signal.

The audio converter 480 may operate based on a plurality of modes. The audio converter 480 may operate based on one of the plurality of modes, based on an application executed in the electronic device 400. The modes of the audio converter 480 may include a first sound quality mode and a second sound quality mode. For example, when a voice recording application is executed in the electronic device 400, the audio receiving unit may operate in the first sound quality mode. When a voice wakeup application is executed in the electronic device 400, the audio receiving unit may operate in the second sound quality mode. For example, the first sound quality mode may include a differential mode. The second sound quality mode may include a single-ended mode.

The audio converter 480 may be driven based on at least two power modes. The power modes may include a first power mode and a second power mode. For example, the first power mode may include a differential mode. The second power mode may include a single-ended mode. For example, in the first sound quality mode, the audio converter 480 may be driven based on the first power mode. Also, in the second sound quality mode, the audio converter 480 may be driven based on the second power mode. The processor 410 includes a determining module 430 and a receiving/outputting module 450.

The determining module 430 may determine state information of the electronic device 400 or an application executed in the electronic device 400. The state information may include, for example, a power state, an activation state, an execution state of an application, location information (e.g., airplane, home, and the like) of an electronic device, or surrounding environment information (e.g., the level of noise, brightness information, emergency situation, and the like) of the electronic device 400. The determining module 430 may determine whether the power state of the electronic device is greater than or equal to a predetermined state (e.g., whether the residual charge quantity of a battery is greater than or equal to 30% of the battery).

The receiving/outputting module 450 may receive or output an audio signal through the audio converter 480, in a predetermined mode, based on the state information of the electronic device or an application executed in the electronic device. The receiving/outputting module 450 may receive or output an audio signal in a first power mode or a second power mode, based on the state information of the electronic device. The first power mode may be, for example, a mode in which the power consumption is higher than the second power mode. The first power mode may include, for example, a differential mode. The second power mode may include, for example, a single-ended mode. For example, when the power state of an electronic device is less than a predetermined state (e.g., when the residual charge quantity of a battery is less than 30% of the battery), the receiving/outputting module 450 may receive an audio signal based on a single-ended mode. When the power state of the electronic device is greater than or equal to the predetermined state, the receiving/outputting module 450 may receive an audio signal based on a differential mode.

For example, when the electronic device is in a deactivated state (e.g., sleep mode), the receiving/outputting module 450 may receive an audio signal based on a single-ended mode. When the electronic device is in an activated state (e.g., active mode), the receiving/outputting module 450 may receive an audio signal based on a differential mode. For example, when an application is executed in the electronic device, the receiving/outputting module 450 may receive an audio signal based on a differential mode. When an application (e.g., a video call) is not executed in the electronic device, the receiving/outputting module 450 may receive an audio signal based on a single-ended mode.

The receiving/outputting module 450 may receive or output an audio signal based on a first sound quality mode or a second sound quality mode, based on the state information of the electronic device. The first sound quality mode may be, for example, a mode (e.g., a mode with a low noise) in which the sound quality is higher than the second sound quality mode. The first sound quality mode may include, for example, a differential mode. The second sound quality mode may include, for example, a single-ended mode. For example, when it is determined that the electronic device is located in a first location (e.g., airplane) where noise is high, the receiving/outputting module 450 may output an audio signal in a differential mode. When it is determined that the electronic device is located in a second location (e.g., home) where noise is low, the receiving/outputting module 450 may output an audio signal in a single-ended mode.

The receiving/outputting module 450 may receive or output an audio signal in the first sound quality mode or the second sound quality mode, based on an application executed in the electronic device. For example, when a first application (e.g., voice recognition), in which sound quality is an important factor, is executed in the electronic device, the receiving/outputting module 450 may receive an audio signal in a differential mode. When a second application (e.g., voice wakeup), which does not require a good sound quality, is executed in the electronic device, the receiving/outputting module 450 may receive an audio signal in a single-ended mode.

Figure 5:
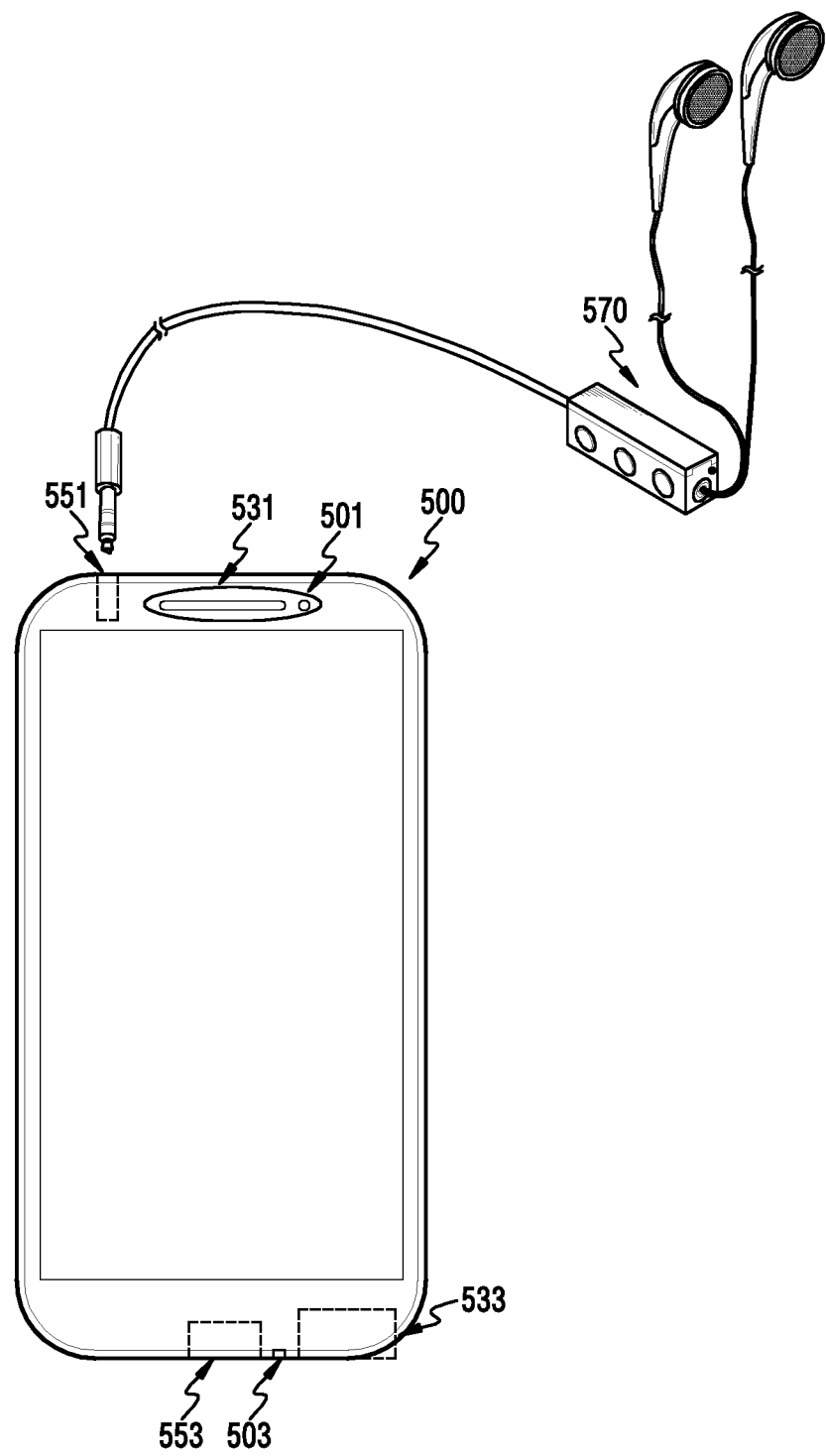
FIG. 5 illustrates an example of an electronic device according to an embodiment of the present disclosure.

FIG. 5 illustrates an example of an electronic device according to an embodiment of the present disclosure.

Referring to FIG. 5, an electronic device 500 includes a speaker 531 and 533, a microphone 501 and 503, and a connector 551 and 553. A microphone may include, for example, an ECM or an MEMS microphone.

The connector 551 and 553 may receive an audio signal from an external device 570 (e.g., an earphone, a speaker, and the like), or may transmit an audio signal to the external device 570. The electronic device 500 may receive or transmit an audio signal through wireless communication.

Figure 6:
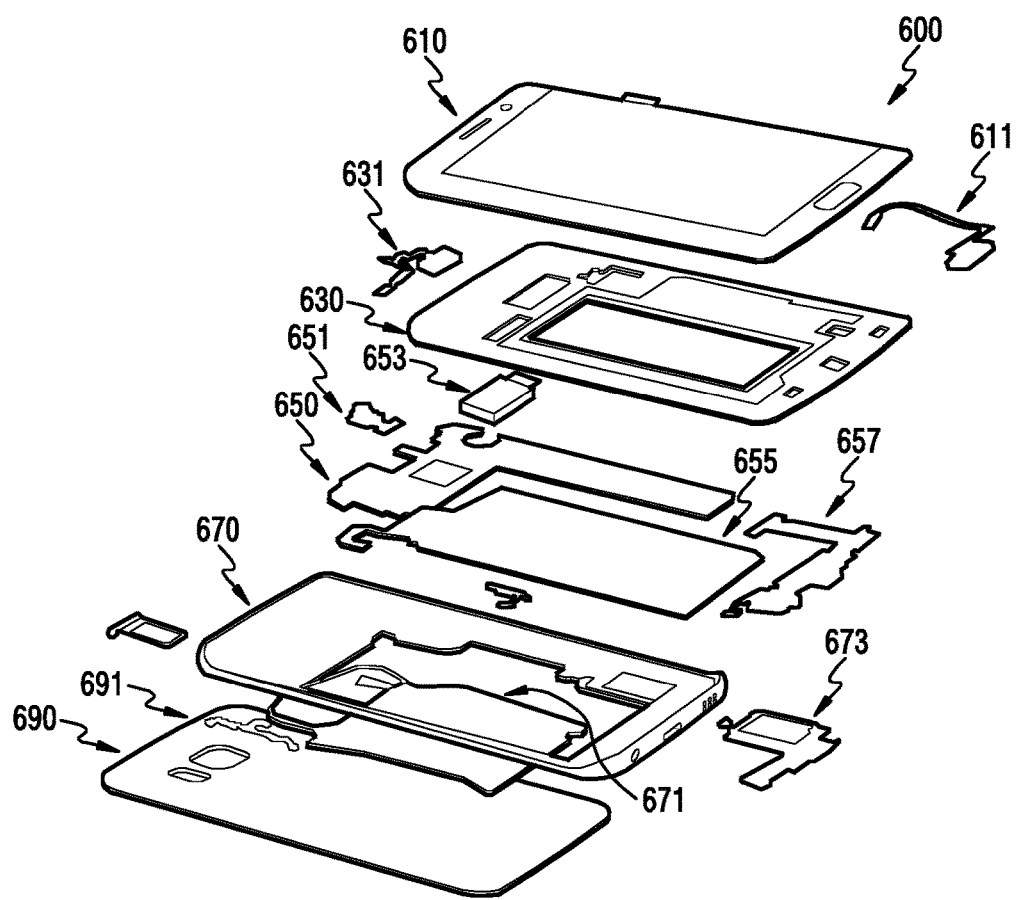
FIG. 6 is an exploded perspective view of an electronic device according to an embodiment of the present disclosure.

FIG. 6 is an exploded perspective view of an electronic device according to an embodiment of the present disclosure.

Referring to FIG. 6, an electronic device 600 includes a display module 610, a home key 611, a front body 630, a main speaker/microphone module 631, a main printed circuit board (PCB) 650, a front camera 651, a back camera 653, a battery 655, a sub-PCB 657, a rear body 670, a wireless charging module 671, a sub-speaker/microphone module 673, a battery cover 690, and an antenna 691.

The display module 610 may be disposed in the front side of the electronic device 600. The home key 611 may be connected to the main PCB 650. For example, the home key 611 may be disposed in the lower portion of the display module 610. The front body 630 may support the display module 610 and the home key 611. For example, the front body 630 may be locked into the display module 610.

The main speaker/microphone module 631 may be connected with the main PCB 650. For example, the main speaker/microphone module 631 may be disposed in the upper portion of the display module 610. The main speaker/microphone module 631 may be mounted between the display module 610 and the front body 630. The main PCB 650 may be disposed in the back of the front body 630. The front camera 651 and the back camera 653 may be connected with the main PCB 650. For example, the front camera 651 and the back camera 653 may be disposed between the front body 630 and the main PCB 650. The front camera 651 may face the display module 610, and the back camera 653 may face the battery cover 690.

The battery 655 may be disposed in the back of the front body 630. For example, the battery 655 may be disposed in one lateral side of the main PCB 650. The sub PCB 657 may be connected with the main PCB 650. For example, the sub PCB 657 may be disposed in one lateral side of the main PCB 650 and the battery 655. The rear body 670 may support the display module 610, the home key 611, the front body 630, the main speaker/microphone module 631, the main PCB 650, the front camera 651, the back camera 653, the battery 655, and the sub PCB 657. For example, the rear body 670 may be locked into the front body 630. The wireless charging module 671 may be connected with the battery 655. For example, the wireless charging module 671 may be attached to at least one of the battery 655 and the battery cover 690. The sub-speaker/microphone module 673 may be connected with the sub-PCB 657. For example, the sub-speaker/microphone 673 may be disposed in the lower portion of the rear body 670.

The battery cover 690 may be disposed in the back of the rear body 670. For example, the battery cover 690 may be locked into the rear body 670. The antenna 691 may be attached to the back of the rear body 670.

Figure 7:
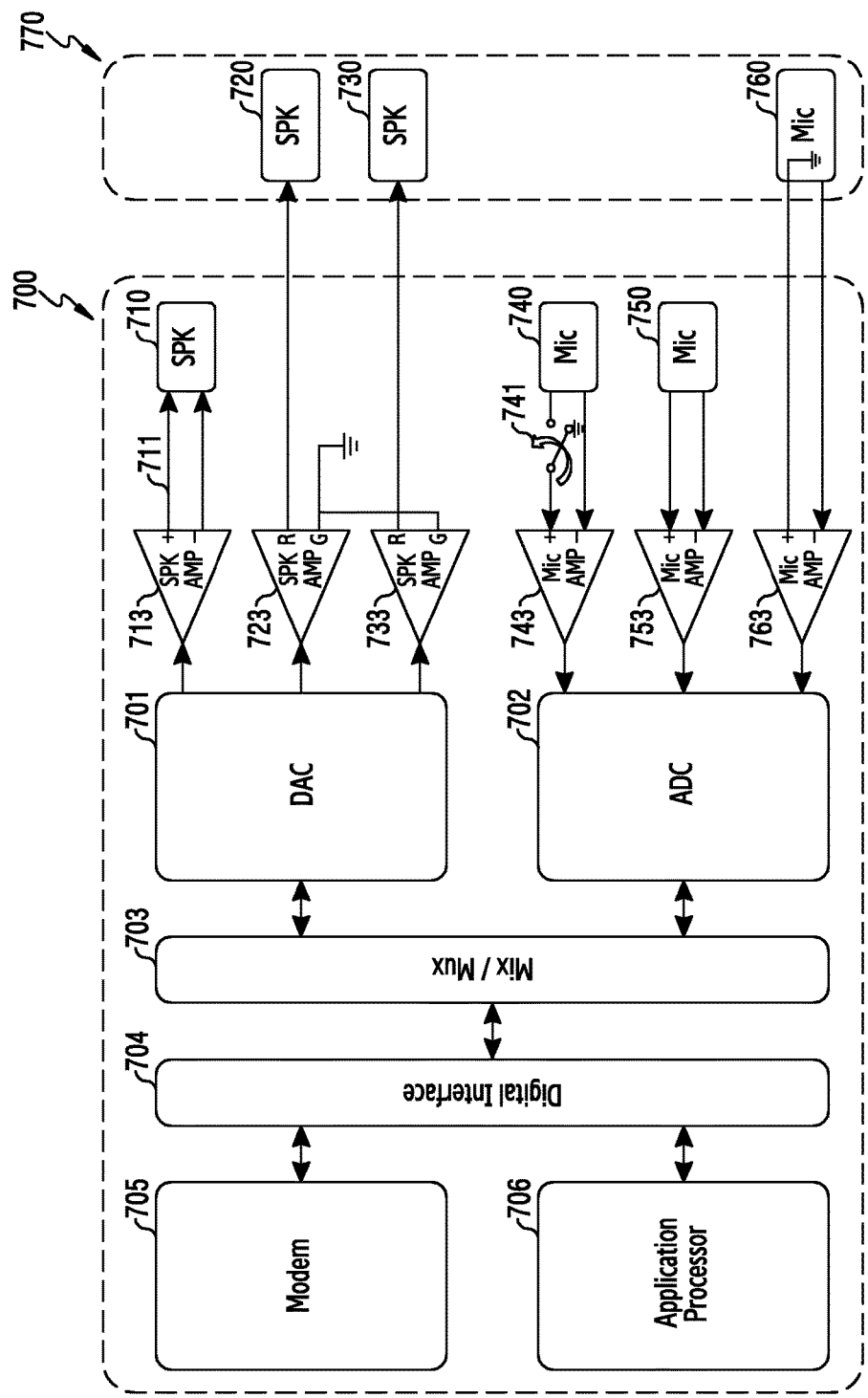
FIG. 7 is a circuit diagram of an electronic device according to an embodiment of the present disclosure.

FIG. 7 is a circuit diagram of an electronic device according to an embodiment of the present disclosure.

Referring to FIG. 7, an electronic device 700 may receive an audio signal from an external device 770, or may transmit an audio signal to the external device 770. For example, the external device 770 may be an earphone or a speaker device.

The electronic device 700 includes a digital to analog converter (DAC) 701, an analog to digital converter (ADC)

702, a mix/mux 703, a digital interface 704, a modem 705, an application processor 706, a speaker 710, a plurality of speaker amplifiers 713, 723, and 733, microphones 740 and 750, a switch 741, and a plurality of microphone amplifiers 743, 753, and 763. The external device 770 may include one or more speakers 720 and 730 and a microphone 760.

The speaker 710 may operate in a differential mode. One or more speakers 720 and 730 included in the external device 770 may operate in a single-ended mode. For example, the speaker 720 included in the external device 770 may be a device for outputting sound to the left ear of a user, and the speaker 730 included in the external device 770 may be a device for outputting sound to the right ear of the user. The microphone 740 may operate in a differential mode or a single-ended mode. For example, based on a connection of the switch 741, the microphone 740 may operate in a differential mode or a single-ended mode. For example, the switch 741 may be connected with the microphone 740. Accordingly, the microphone 740 may operate in a differential mode. For example, the switch 741 may be connected with a grounding device, instead of the microphone 740. Accordingly, the microphone 740 may operate in a single-ended mode.

The microphone 750 may operate in a differential mode. The external microphone 760 may operate in a single-ended mode.

The DAC 701 may convert an audio signal to be transmitted to at least one of the speaker 710 included in the electronic device 700 and one or more speakers 720 and 730 included in the external device 770. For example, the DAC 701 may convert a digital audio signal into an analog audio signal. The ADC 702 may convert an audio signal that is received through at least one of the microphones 740 and 750 included in the electronic device 700 and the microphone 760 included in the external device 770. For example, the ADC 702 may convert an analog audio signal into a digital audio signal.

The MIX/MUX 703 may multiplex an audio signal to be transmitted to at least one of the speaker 710 and the external speakers 720 and 730. The MIX/MUX 703 may de-multiplex an audio signal that is received through at least one of the microphones 740 and 750 and the microphone 760 included in the external device 770. The digital interface 704 may serve as an interface between the MIX/MUX 703, and the modem 705 and application processor 706.

The modem 705 may modulate an audio signal to be transmitted to at least one of the speaker 710 and the external speakers 720 and 730. The modem 705 may demodulate an audio signal that is received through at least one of the microphones 740 and 750 and the microphone 760 included in the external device 770. The application processor 706 may process an audio signal based on an application executed in the electronic device 700.

The speaker amplifiers 713, 723, and 733 may amplify an audio signal to be transmitted to at least one of the speaker 710 and the external speakers 720 and 730 included in the external device 770. The at least one microphone amplifier 743, 753, and 763 may amplify an audio signal that is received through at least one of the microphones 740 and 750 and the microphone 760 included in the external device 770.

Although FIG. 7 illustrates the electronic device 700 including the single speaker 710 and the plurality of microphones 740 and 750, and the external electronic device 770 including the plurality of speakers 720 and 730, and the microphone 760, the present disclosure is not limited thereto. For example, the electronic device 700 may include a plurality of speakers and a single microphone, and/or the external electronic device 770 may include only a single speaker.

Figure 8:
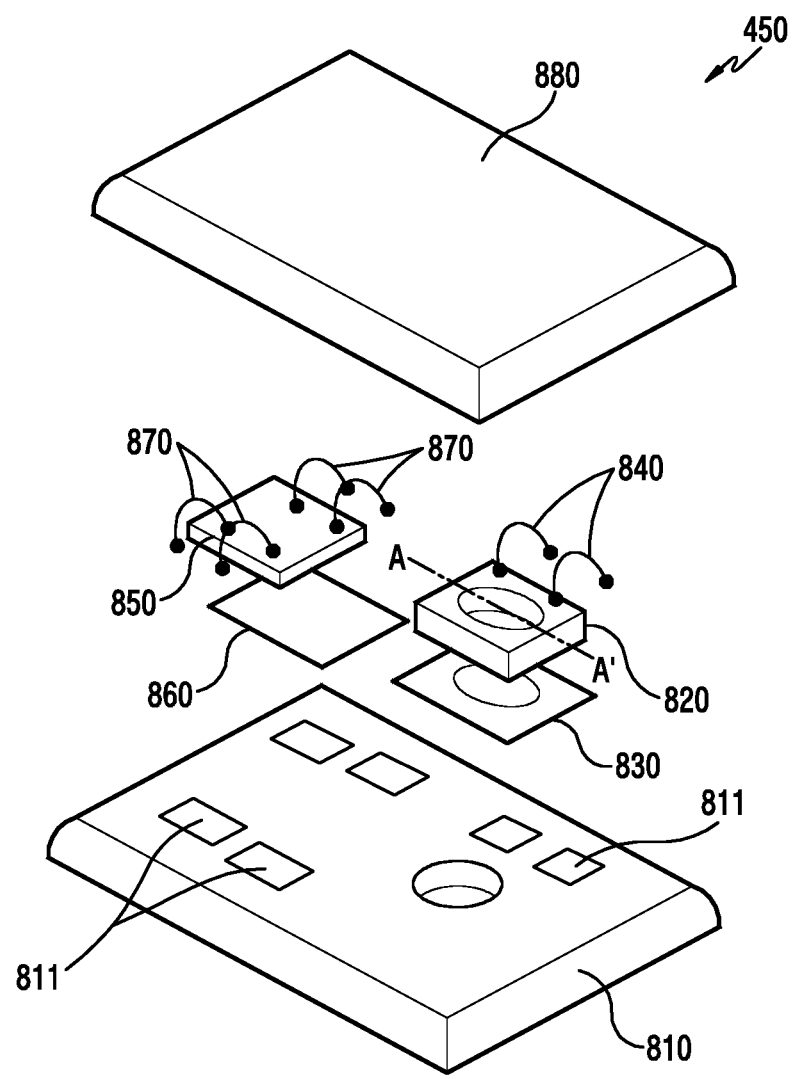
FIG. 8 illustrates an example of an audio receiving unit according to an embodiment of the present disclosure.
Figure 9:
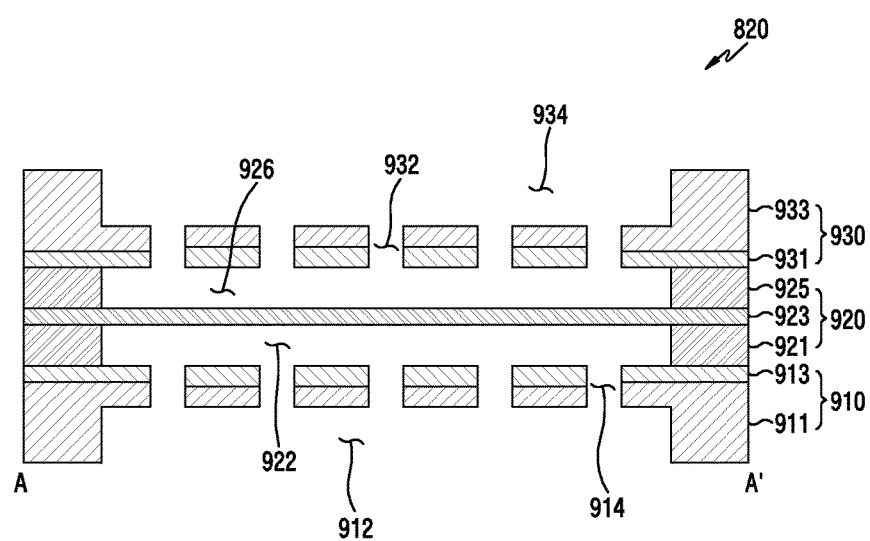
FIG. 9 is a sectional view that is cut along A-A' of FIG. 8, according to an embodiment of the present disclosure.

FIG. 8 illustrates an example of an audio receiving unit according to an embodiment of the present disclosure. FIG. 9 is a sectional view that is cut along A-A' of FIG. 8, according to an embodiment of the present disclosure.

Referring to FIG. 8, an audio receiving unit includes a driving substrate 810, a first driving chip 820, a first adhesive member 830, at least one first bonding wire 840, a second driving chip 850, a second adhesive member 860, at least one second bonding wire 870, and a protective member 880.

The audio receiving unit may be provided with power and supported by the driving substrate 810. The driving substrate 810 may be, for example, a printed circuit board (PCB). The driving substrate 810 may have, for example, a plate structure. For example, the driving substrate 810 may be embodied as a single layer or a plurality of layers. The driving substrate 810 may be formed of, for example, a dielectric substance.

The driving substrate 810 may include a plurality of connection pads 811. The driving substrate 810 may include, for example, a transmission cable. The transmission cable, for example, may be connected with the connection pads 811. For example, the connection pad 811 or the transmission cable may be formed of a conductive substance. The conductive substance may include at least one of silver (Ag), palladium (Pd), platinum (Pt), copper (Cu), gold (Au), and nickel (Ni).

The first driving chip 820 may be mounted on the driving substrate 810. For example, the first driving chip 820 includes a first back plate part 910, a membrane part 920, and a second back plate part 930, as illustrated in FIG. 9.

The first back plate part 910 may be disposed under the membrane part 920. For example, the first back plate part 910 may be disposed in the opposite side of the second back plate part 930, based on the membrane part 920. The first back plate part 910 includes a first back substrate 911 and a first back electrode 913. First penetrative holes 914 may be formed in the first back plate part 910.

The first back substrate 911 may support the first back electrode 913. For example, the first back substrate 911 may be disposed under the first back electrode 913. The first back substrate 911 may be formed of, for example, a dielectric substance. A first resonance space 912 may be formed in the first back substrate 911. For example, a first resonance space 912 may be formed in the lower portion of the first back substrate 911, to correspond to the first opening portion 922 of the first base substrate 921.

The first back electrode 913 may be disposed under the first base substrate 921. For example, the first back electrode 913 may face the vibration plate 923. The first back electrode 913 may be spaced apart from the vibration plate 923. For example, the first back electrode 913 may be spaced apart from the vibration plate 923 by the first opening portion 922 of the first base substrate 921. The first back electrode 913 may be formed of, for example, a conductive substance.

The first penetrative holes 914 may penetrate the first back substrate 911 and the first back electrode 913. For example, the first penetrative holes 914 may be disposed in the central area of the first back substrate 911 and the first back electrode 913. The first penetrative holes 914 may connect the first resonance space 912 of the first back substrate 911 and the first opening portion 922 of the first base substrate 921.

Using the method described above, when current is supplied to the first back electrode 913, the space between the vibration plate 923 and the first back electrode 913 may be charged with an electric charge. In response to the vibration of the vibration plate 923, a change in capacitance may be generated between the vibration plate 923 and the first back electrode 913. Accordingly, the first back electrode 913 may detect a first audio signal from the change in capacitance.

The membrane part 920 may be disposed between the first back plate part 910 and the second back plate part 930. For example, the membrane part 920 includes a first base substrate 921, a vibration plate 923, and a second base substrate 925.

The first base substrate 921 and the second base substrate 925 may support the vibration plate 923. For example, the first base substrate 921 may be disposed under the vibration plate 923, and the second base substrate 925 may be disposed on the vibration plate 923. The first base substrate 921 and the second base substrate 925 may support an edge area of the vibration plate 923. To this end, a first opening portion 922 may be formed in the central area of the first base substrate 921, and a second opening portion 926 may be formed in the central area of the second base substrate 925. For example, the first base substrate 921 and the second base substrate 925 may be formed of a dielectric substance.

The vibration plate 923 may be disposed between the first base substrate 921 and the second base substrate 925. For example, the central area of the vibration plate 923 may be exposed through the first opening portion 922 of the first base substrate 921 and the second opening portion 926 of the second base substrate 925. The vibration plate 923 may be formed as a single layer. Using the method described above, the vibration plate 923 may vibrate based on the sound pressure of sound waves. The vibration plate 923 may be electroconductive. For example, the vibration plate 923 may be formed of electrets or silicon.

The second back plate part 930 may be disposed on the membrane part 920. For example, the second back plate part 930 may be disposed in the opposite side of the first back plate part 910, based on the membrane part 920. For example, the second back plate part 930 includes a second back electrode 931 and a second back substrate 933. The second penetrative holes 932 may be formed in the second back plate part 932.

The second back electrode 931 may be disposed on the second base substrate 925. For example, the second back electrode 931 may face the vibration plate 923. The second back electrode 931 may be spaced from the vibration plate 923. For example, the second back electrode 931 may be spaced from the vibration plate 923 by the second opening portion 926 of the second base substrate 925. The second back electrode 931 may be formed of, for example, a conductive substance.

The second back substrate 933 may support the second back electrode 931. For example, the second back substrate 933 may be disposed on the second back electrode 931. The second back substrate 933 may be formed of, for example, a dielectric substance. A second resonance space 934 may be formed in the second back substrate 933. For example, the second resonance space 934 may be formed in the upper portion of the second back substrate 933, to correspond to the second opening portion 926 of the second base substrate 925.

The second penetrative holes 932 may penetrate the second back electrode 931 and the second back substrate 933. For example, the second penetrative holes 932 may be disposed in the central area of the second back electrode 931 and the second back substrate 933. The second penetrative holes 932 may connect the second opening portion 926 of the second base substrate 925 and the second resonance space 934 of the second back substrate 933.

Using the method described above, when current is supplied to the second back electrode 931, the space between the vibration plate 923 and the second back electrode 931 may be charged with an electric charge. In response to the vibration of the vibration plate 923, a change in capacitance may be generated between the vibration plate 923 and the second back electrode 931. Accordingly, the second back electrode 931 may detect a second audio signal from the change in capacitance.

The first adhesive member 830 may fix the first driving chip 820 to the driving substrate 810. For example, the first adhesive member 830 may bond the first driving chip 820 to the driving substrate 810.

The first bonding wire 840 may electrically connect the first driving chip 820 to the driving substrate 810. For example, the first bonding wire 840 may connect the first driving chip 820 to the connection pad 811 of the driving substrate 810. The first bonding wire 840 may separately connect the first back plate part 910 and the second back plate part 930 to the driving substrate 810. For example, the first bonding wire 840 may be formed of a conductive substance. The conductive substance may include at least one of Ag, Pd, Pt, Cu, Au, and Ni.

The second driving chip 850 may be mounted on the driving substrate 810. The second adhesive member 860 may fix the second driving chip 850 to the driving substrate 810. For example, the second adhesive member 860 may bond the second driving chip 850 to the driving substrate 810.

The second bonding wire 870 may electrically connect the second driving chip 850 to the driving substrate 810. For example, the second bonding wire 870 may connect the second driving chip 850 to the connection pad 811 of the driving substrate 810. For example, the second bonding wire 870 may be formed of a conductive substance. The conductive substance may include at least one of Ag, Pd, Pt, Cu, Au, and Ni.

The protective member 880 may protect, for example, the driving substrate 810, the first driving chip 820, the first adhesive member 830, the first bonding wire 840, the second driving chip 850, the second adhesive member 860, and the second bonding wire 870. For example, the protective member 880 may accommodate, for example, the driving substrate 810, the first driving chip 820, the first adhesive member 830, the first bonding wire 840, the second driving chip 850, the second adhesive member 860, and the second bonding wire 870. The protective member 880 may be locked into the driving substrate 810. The protective member 880 may have a dome shape.

Figure 10:
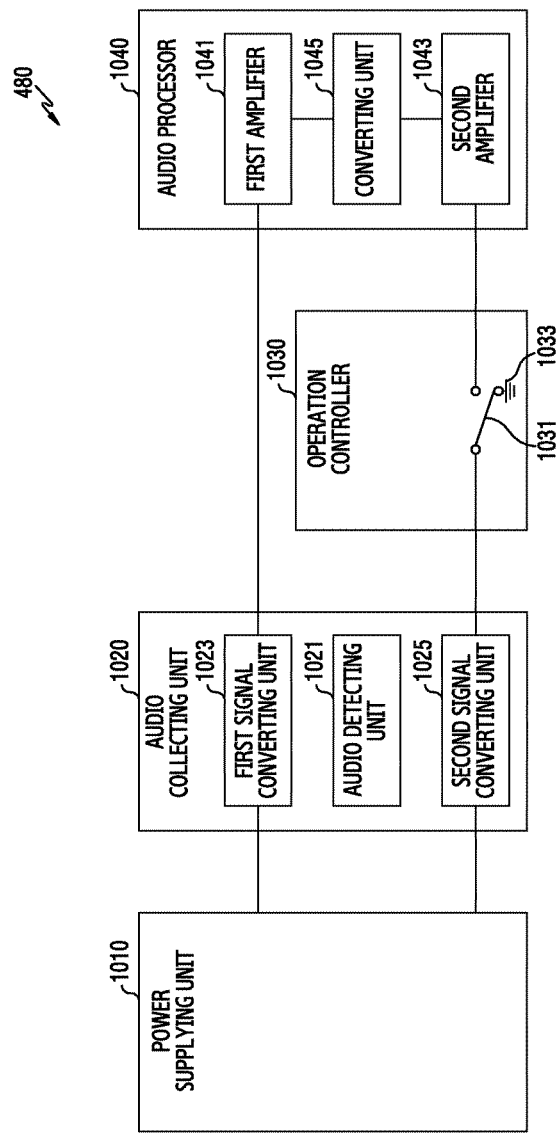
FIG. 10 is a block diagram illustrating an audio converter according to an embodiment of the present disclosure.
Figure 11:
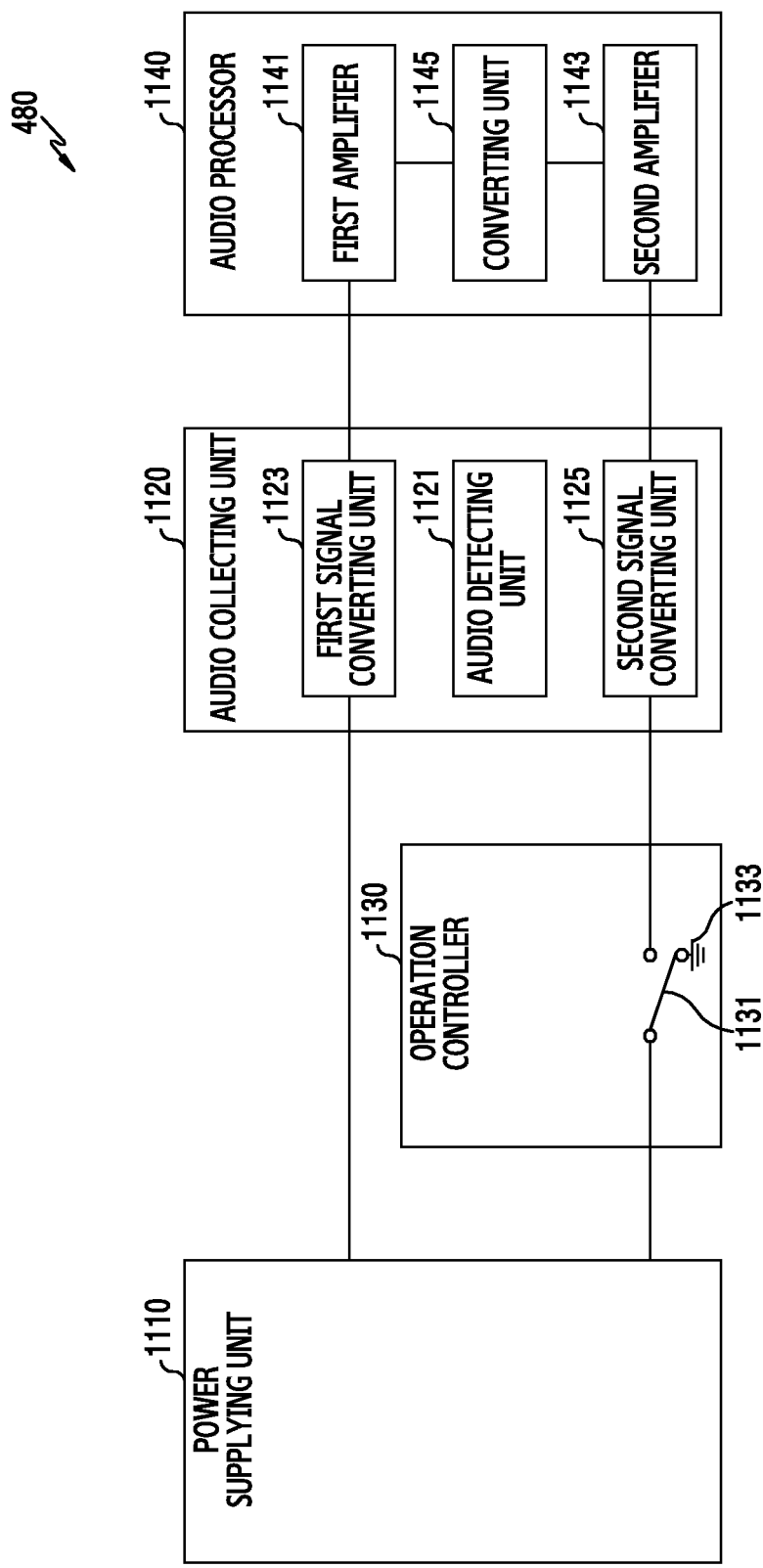
FIG. 11 is a block diagram illustrating an audio converter according to an embodiment of the present disclosure.
Figure 12:
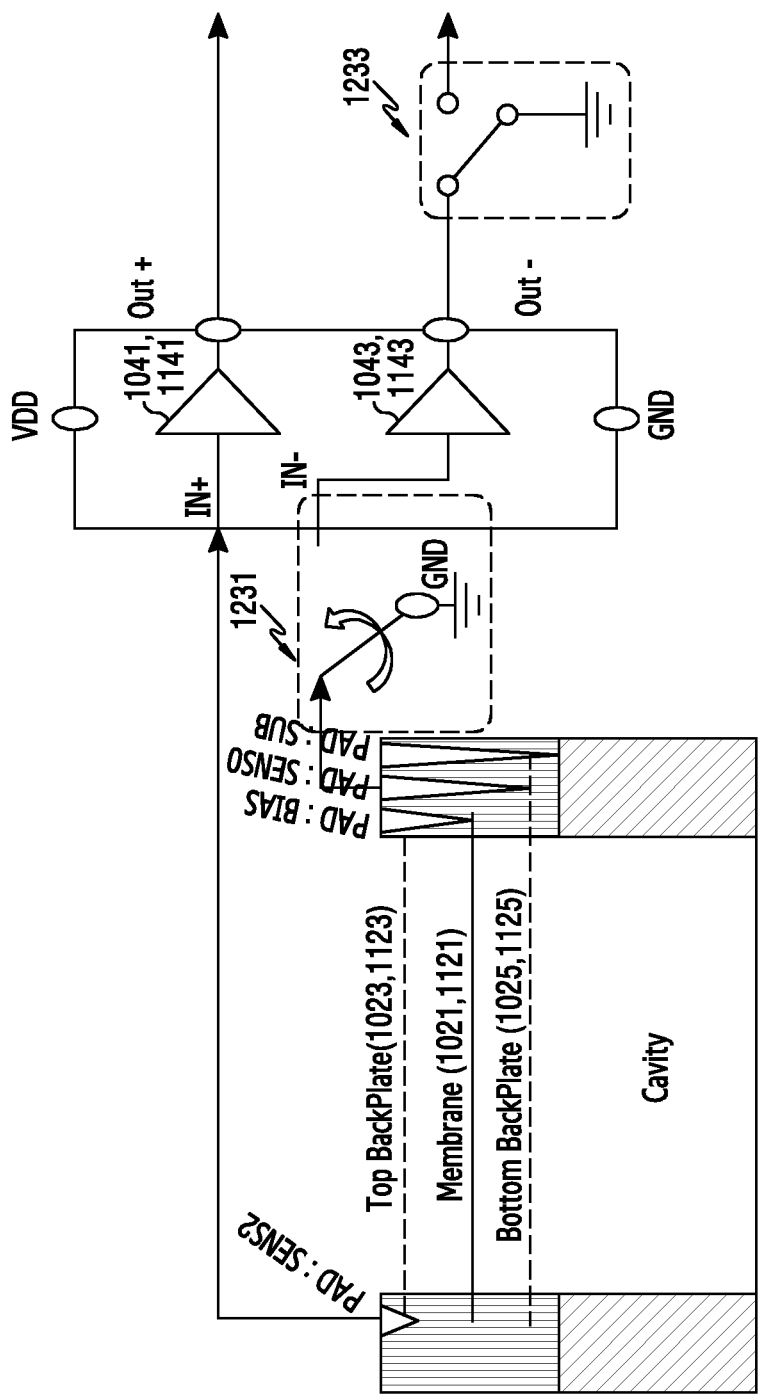
FIG. 12 is a circuit diagram of the audio converter according to an embodiment of the present disclosure.

FIG. 10 is a block diagram illustrating an audio converter according to an embodiment of the present disclosure. FIG. 11 is a block diagram illustrating an audio converter according to an embodiment of the present disclosure. FIG. 12 is a circuit diagram of an audio converter according to an embodiment of the present disclosure.

Referring to FIGS. 10 and 11, the audio converter 480 includes power supplying units 1010 and 1110, audio collecting units 1020 and 1120, operation controllers 1030 and 1130, and audio processors 1040 and 1140.

The power supplying units 1010 and 1110 may supply power to the components of the electronic device 400. For example, the power supplying units 1010 and 1110 may receive power from an external power. The power supplying units 1010 and 1110 may be charged with the received power. The power supplying units 1010 and 1110 may be connected wired or wirelessly with the external power, and may receive power. The power supplying units 1010 and 1110 may convert power, and store the same.

The audio collecting units 1020 and 1120 may collect an audio signal. The audio collecting units 1020 and 1120 may detect an audio signal from sound waves. The audio collecting units 1020 and 1120 may detect an analog audio signal. The audio collecting units 1020 and 1120 may include, for example, audio detecting units 1021 and 1121 and a plurality of signal converting units 1023, 1025, 1123, and 1125.

The audio detecting unit 1021 and 1121 may vibrate by sound waves. The audio detecting unit 1021 and 1121 may vibrate, for example, based on the sound pressure of sound waves. Sound waves may be generated from sound around the electronic device 400, and may pass through the air. Accordingly, a change in the air pressure, that is, the sound pressure, may be generated by sound waves.

The signal converting units 1023, 1025, 1123, and 1125 may detect an audio signal from sound waves. The signal converting units 1023, 1025, 1123, and 1125 may detect an audio signal in response to, for example, the vibration of the audio detecting unit 1021 and 1121. The signal converting units 1023, 1025, 1123, and 1125 may detect an analog audio signal. To this end, the signal converting units 1023, 1025, 1123, and 1125 may be electrically connected with the power supplying units 1010 and 1110. The signal converting units 1023, 1025, 1123, and 1125, for example, may be separately connected with the power supplying units 1010 and 1110. The power supplying units 1010 and 1110, for example, may supply current to the signal converting units 1023, 1025, 1123, and 1125.

As illustrated in FIG. 12, the signal converting units 1023, 1025, 1123, and 1125 may include, for example, the first signal converting units 1023 and 1123 and the second signal converting units 1025 and 1125. The audio detecting units 1021 and 1121 may be disposed between the first signal converting units 1023 and 1123 and the second signal converting units 1025 and 1125. The audio detecting units 1021 and 1121 may vibrate between the first signal converting units 1023 and 1123 and the second signal converting units 1025 and 1125.

The first signal converting units 1023 and 1123 may face the audio detecting units 1021 and 1121. The first signal converting units 1023 and 1123 may be disposed in the opposite side of the second signal converting units 1025 and 1125 based on the audio detecting units 1021 and 1121. When current is provided to the first signal converting units 1023 and 1123 from the power supplying units 1010 and 1110, the space between the audio detecting units 1021 and 1121 and the first signal converting units 1023 and 1123 may be charged with an electric charge. In response to the vibration of the audio detecting units 1021 and 1121, a change in capacitance may be generated between the audio detecting units 1021 and 1121 and the first signal converting units 1023 and 1123. Accordingly, the first signal converting units 1023 and 1123 may detect a first audio signal from the change in capacitance.

The second signal converting units 1025 and 1125 may face the audio detecting units 1021 and 1121. The second signal converting units 1025 and 1125 may be disposed on the opposite side of the first signal converting units 1023 and 1123. When current is provided to the second signal converting units 1025 and 1125 from the power supplying units 1010 and 1110, the space between the audio detecting units 1021 and 1121 and the second signal converting units 1025 and 1125 may be charged with an electric charge. In response to the vibration of the audio detecting units 1021 and 1121, a change in capacitance may be generated between the audio detecting units 1021 and 1121 and the second signal converting units 1025 and 1125. Accordingly, the second signal converting units 1025 and 1125 may detect a second audio signal from the change in capacitance.

In a first sound quality mode, both the first signal converting units 1023 and 1123 and the second signal converting units 1025 and 1125 may be driven. A first audio signal may be detected by the first signal converting units 1023 and 1123 and a second audio signal may be detected by the second signal converting units 1025 and 1125. The first audio signal and the second audio signal may have phases that are out of phase with each other because the first signal converting units 1023 and 1123 and the second signal converting units 1025 and 1125 are disposed on the opposite side based on the audio detecting units 1021 and 1121.

In a second sound quality mode, the first signal converting units 1023 and 1123 may be driven and the second signal converting units 1025 and 1125 may not be driven. A first audio signal may be detected by the first signal converting units 1023 and 1123 and a second audio signal may not be detected by the second signal converting units 1025 and 1125.

The operation controllers 1030 and 1130 may control driving of the audio collecting units 1020 and 1120. The operation controllers 1030 and 1130, for example, may control driving of at least one of the signal converting units 1023, 1025, 1123, and 1125. The operation controller 1030 and 1130 may control driving of at least one of the signal converting units 1023, 1025, 1123, and 1125, based on an application executed in the electronic device 400. For example, the operation controllers 1030 and 1130 may determine whether to drive at least one of the signal converting units 1023, 1025, 1123, and 1125. Alternatively, the operation controllers 1030 and 1130, for example, may control driving of at least one of the signal converting units 1023, 1025, 1123, and 1125, under the control of the processor 410.

As illustrated in FIG. 12, the operation controllers 1030 and 1130 may be connected with at least one of the signal converting units 1023, 1025, 1123, and 1125. For example, the operation controllers 1030 and 1130 may be connected with the second signal converting units 1025 and 1125. In this instance, the operation controllers 1030 and 1130 may control driving of the second signal converting units 1025 and 1125. The operation controllers 1030 and 1130 include switch devices 1031 and 1131. The switch device 1031 may include at least one of switches 1231 and 1233.

As illustrated in FIG. 10, the operation controller 1030 may control a connection between the audio collecting unit 1020 and the audio processor 1040. To this end, the operation controller 1030, for example, may be disposed between the audio collecting unit 1020 and the audio processor 1040. The operation controller 1030, for example, may control a connection between the audio processor 1040 and at least one of the signal converting units 1023 and 1025.

For example, the operation controller 1030 controls a connection between the second signal converting unit 1025 and the audio processor 1040. To this end, the operation controller 1030 is disposed between the second signal converting unit 1025 and the audio processor 1040. The operation controller 1030 may connect the second signal converting unit 1025 and the audio processor 1040, or may disconnect the second signal converting unit 1025 and the audio processor 1040, by using the switch device 1031. For example, the operation controller 1030 may connect the second signal converting unit 1025 and the audio processor 1040, by using the switch device 1031, in the first sound quality mode. Using the method described above, the operation controller 1030 may transfer a second audio signal from the second signal converting unit 1025 to a second amplifier 1043. For example, the operation controller 1030 may disconnect the second signal converting unit 1025 and the audio processor 1040, by using the switch device 1031, in the second sound quality mode. Using the method described above, the operation controller 1030 may block a second audio signal from the second signal converting unit 1025 to the second amplifier 1043. For example, the switch device 1031 may disconnect the second signal converting unit 1025 and the audio processor 1040, and may be connected with a grounding device 1033. The switch device 1031 may connect the second signal converting unit 1025 to the grounding device 1033. Alternatively, the switch device 1031 may connect the audio processor 1040 to the grounding device 1033.

As illustrated in FIG. 11, the operation controller 1130 may control a connection between the power supplying unit 1110 and the audio collecting unit 1120. To this end, the operation controller 1130, for example, may be disposed between the power supplying unit 1110 and the audio collecting unit 1120. The operation controller 1130, for example, may control a connection between the power supplying unit 1110 and at least one of the signal converting units 1123, and 1125.

For example, the operation controller 1130 may control the connection between the power supplying unit 1110 and the second signal converting unit 1125. To this end, the operation controller 1130 may be disposed between the power supplying unit 1110 and the second signal converting unit 1125. The operation controller 1130 may connect the power supplying unit 1110 and the second signal converting unit 1125, or may disconnect the power supplying unit 1110 and the second signal converting unit 1125, by using the switch device 1131. For example, the operation controller 1130 may connect the power supplying unit 1110 and the second signal converting unit 1125, by using the switch device 1131, in the first sound quality mode. To this end, the operation controller 1130 may transfer current from the power supplying unit 1110 to the second signal converting unit 1125. For example, the operation controller 1030 may disconnect the power supplying unit 1110 and the second signal converting unit 1125, by using the switch device 1131, in the second sound quality mode. Using the method described above, the operation controller 1130 may block current from the power supplying unit 1110 to the second signal converting unit 1125. For example, the switch device 1131 may disconnect the power supplying unit 1110 and the second signal converting unit 1125, and may be connected with the grounding device 1133. The switch device 1131 may connect the power supplying unit 1110 with the grounding device 1133. Alternatively, the switch device 1131 may connect the second signal converting unit 1125 with the grounding device 1133.

The audio processors 1040 and 1140 may process an audio signal as an electric signal. The audio processors 1040 and 1140 may include at least one amplifier 1041, 1043, 1141, and 1143, and a converting unit 1045 and 1145. The audio processors 1040 and 1140 may amplify an audio signal. The audio processors 1040 and 1140 may convert an analog audio signal into a digital audio signal. The amplifiers 1041, 1043, 1141, and 1143 may amplify an audio signal. The amplifiers 1041, 1043, 1141, and 1143 may be connected with signal converting units 1023, 1025, 1123, and 1125. The amplifiers 1041, 1043, 1141, and 1143, for example, may be separately connected with signal converting units 1023, 1025, 1123, and 1125. Using the method described above, when an audio signal is received from each signal converting unit 1023, 1025, 1123, and 1125, each amplifier 1041, 1043, 1141, and 1143 may amplify an audio signal.

As illustrated in FIG. 12, the amplifiers 1041, 1043, 1141, and 1143 includes the first amplifier 1041 and 1141 and the second amplifier 1043 and 1143. The first amplifier 1041 and 1141 may be connected with the first signal converting unit 1023 and 1123. When a first audio signal is received from the first signal converting units 1023 and 1123, the first amplifiers 1041 and 1141 may amplify the first audio signal. The second amplifiers 1043 and 1143 may be connected with the second signal converting units 1025 and 1125. When a second audio signal is received from the second signal converting units 1025 and 1125, the second amplifiers 1043 and 1143 may amplify the second audio signal.

In the first sound quality mode, both the first amplifiers 1041 and 1141 and the second amplifiers 1043 and 1143 may be driven. A first audio signal may be amplified by the first amplifiers 1041 and 1141 and a second audio signal may be amplified by the second amplifiers 1043 and 1143. The first audio signal and the second audio signal may be out of phase with each other because the first signal converting units 1023 and 1123 and the second signal converting units 1025 and 1125 are disposed on opposite sides based on the audio detecting units 1021 and 1121. In the second sound quality mode, the first amplifiers 1041 and 1141 may be driven, and the second amplifiers 1043 and 1143 may not be driven. In this instance, a first audio signal may be amplified by the first amplifiers 1041 and 1141, and a second audio signal may not be amplified by the second amplifiers 1043 and 1143.

An audio signal may be converted through the converting units 1045 and 1145. Noise may be eliminated from an audio signal, through the converting units 1045 and 1145. For example, the converting units 1045 and 1145 may detect a differential signal of the first audio signal and the second audio signal. Using the method above, noise in the first audio signal and noise in the second audio signal may be offset and eliminated. The converting units 1045 and 1145 may convert an analog audio signal into a digital audio signal.

Although FIGS. 10 and 11 illustrate the audio converter 480 including the audio processors 1040 and 1140, the present disclosure is not limited thereto. For example, the processor 410 may include the audio processors 1040 and 1140. Alternatively, the audio converter 480 may include the audio processors 1040 and 1140, and the audio processors 1040 and 1140 may include the amplifiers 1041, 1043, 1141, and 1143. In this instance, the processor 410 may include the converting units 1045 and 1145.

According to various embodiments of the present disclosure, an electronic device includes an audio converter to receive or output an audio signal and a processor configured to determine state information of the electronic device or an application executed in the electronic device, and to receive or output the audio signal based on the state information or the application. The processor is configured to receive or output the audio signal based on a first mode when the state information is first state information or when the application is a first application and receive or output the audio signal based on a second mode when the state information is second state information or when the application is a second application.

According to various embodiments of the present disclosure, power consumption of the first mode exceeds power consumption of the second mode.

According to various embodiments of the present disclosure, the state information includes a power state of the electronic device. The processor is configured to determine the state information as the first state information when power of the electronic device is greater than or equal to a predetermined threshold, and receive or output the audio signal based on the first mode and determine the state information as the second state information when the power of the electronic device is less than the threshold value, and receive or output the audio signal based on the second mode.

According to various embodiments of the present disclosure, the state information includes whether the electronic device is activated. The processor is configured to determine the state information as the first state information when the electronic device is in an activated state, and receive or output the audio signal based on the first mode and determine the state information as the second state information when the electronic device is in a deactivated state, and receive or output the audio signal based on the second mode.

According to various embodiments of the present disclosure, the state information includes an execution state of the application. The processor is configured to determine the state information as the first state information when the application is executed in the electronic device, and receive or output the audio signal based on the first mode and determine the state information as the second state information when the application is not executed in the electronic device, and receive or output the audio signal based on the second mode.

According to various embodiments of the present disclosure, the state information includes location information of the electronic device. The processor is configured to determine the state information as the first state information when a location of the electronic device is a first location, and receive or output the audio signal based on the first mode and determine the state information as the second state information when the location of the electronic device is a second location, and receive or output the audio signal based on the second mode.

According to various embodiments of the present disclosure, the first application includes at least one of a voice recording application and a voice recognition application.

According to various embodiments of the present disclosure, the second application includes a voice wakeup application.

According to various embodiments of the present disclosure, the audio converter includes at least one of a speaker and a microphone.

According to various embodiments of the present disclosure, the audio converter further includes a switch that is connected to the speaker or the microphone in the first mode, and is disconnected from the speaker or the microphone in the second mode.

According to various embodiments of the present disclosure, an electronic device may include an audio converting unit to receive or output an audio signal and a processor configured to determine state information of the electronic device or an application executed in the electronic device, and control the audio converting unit based on the state information or the application. The processor is configured to receive or output the audio signal based on a differential mode when the state information is first state information or when the application is a first application and receive or output the audio signal based on a single-ended mode when the state information is second state information or when the application is a second application.

Figure 13:
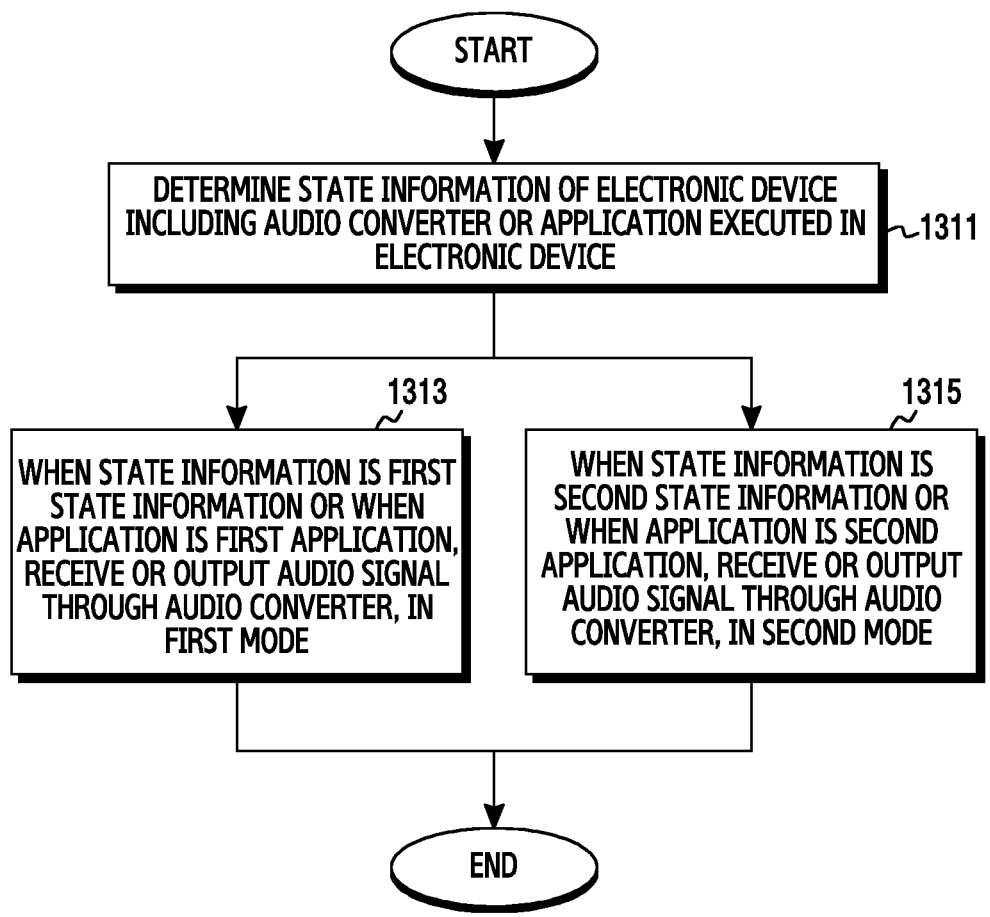
FIG. 13 is a flowchart illustrating an audio converting method according to an embodiment of the present disclosure.

FIG. 13 is a flowchart illustrating an audio converting method according to an embodiment of the present disclosure.

Referring to FIG. 13, according to an embodiment of the present disclosure, the determining module 430 determines state information of the electronic device 400 or an application executed in the electronic device 400, in step 1311. The state information may include, for example, a power state, an activation state, an execution state of an application, location information (airplane, home, and the like) of an electronic device, or surrounding environment information (e.g., the level of noise, brightness information, emergency situation, and the like) of an electronic device. The determining module 430 may determine whether the power state of the electronic device is greater than or equal to a predetermined state (e.g., whether the residual charge quantity of a battery is greater than or equal to 30% of the battery).

Figure 14:
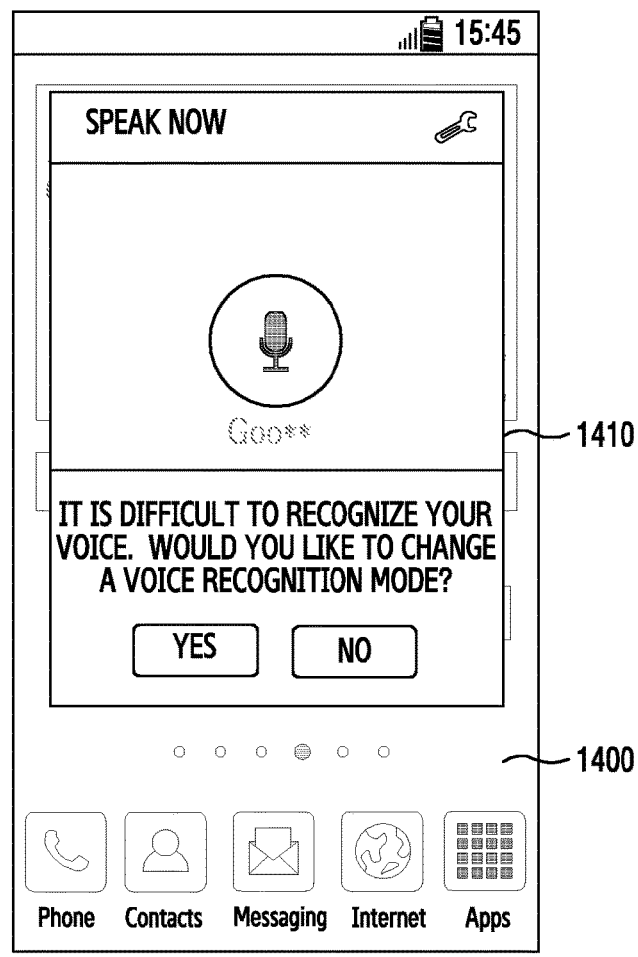
FIG. 14 illustrates an example of an audio converting method according to an embodiment of the present disclosure.

FIG. 14 illustrates an example of an audio converting method according to an embodiment of the present disclosure.

Referring to FIG. 14, a user interface (UI) (e.g., a popup window 1410) may be provided in a screen 1400 based on the state information of the electronic device or an application executed in the electronic device. The UI may include, for example, an image, a picture, or text that enables a user to select a mode for receiving an audio signal.

When the state information of the electronic device 400 is first state information or when the application executed in the electronic device 400 is a first application, the receiving/outputting module 450 receives or outputs an audio signal through the audio converter 480 in a first mode, in step 1313. For example, the receiving/outputting module 450 may receive or output an audio signal based on a first power mode. The first power mode may be, for example, a mode of which the power consumption is higher than the second power mode. The first power mode may include, for example, a differential mode. For example, when the power state of the electronic device is greater than or equal to a predetermined state, the receiving/outputting module 450 may receive an audio signal in a differential mode. When the electronic device is in an activated state (e.g., active mode), the receiving/outputting module 450 may receive an audio signal in a differential mode. When an application is executed in the electronic device, the receiving/outputting module 450 may receive an audio signal in a differential mode. The receiving/outputting module 450 may receive or output an audio signal based on a first sound quality mode. The first sound quality mode may be, for example, a mode (e.g., a mode with low noise) in which the sound quality is higher than the second sound quality mode. The first sound quality mode may include, for example, a differential mode. For example, when it is determined that the electronic device is located in a first location (e.g., home) where noise is low, the receiving/outputting module 450 may output an audio signal in a single-ended mode.

When the state information of the electronic device 400 is second state information or when the application executed in the electronic device 400 is a second application, the receiving/outputting module 450 receives or outputs an audio signal through the audio converter 480 in a second mode, in step 1315. For example, the receiving/outputting module 450 may receive or output an audio signal based on a second power mode. The second power mode may include, for example, a single-ended mode. For example, when the power state of an electronic device is less than a predetermined state (e.g., when the residual charge quantity of a battery is less than 30% of the battery), the receiving/outputting module 450 may receive an audio signal based on a single-ended mode. When the electronic device is in a deactivated state (e.g., sleep mode), the receiving/outputting module 450 may receive an audio signal based on a single-ended mode. When an application (e.g., a video call) is not executed in the electronic device, the receiving/outputting module 450 may receive an audio signal in a single-ended mode. The receiving/outputting module 450 may receive or output an audio signal based on a second sound quality mode. The second sound quality mode may include, for example, a single-ended mode. For example, when it is determined that the electronic device is located in a first location (e.g., home) where noise is low, the receiving/outputting module 450 may output an audio signal in a single-ended mode.

Figure 15:
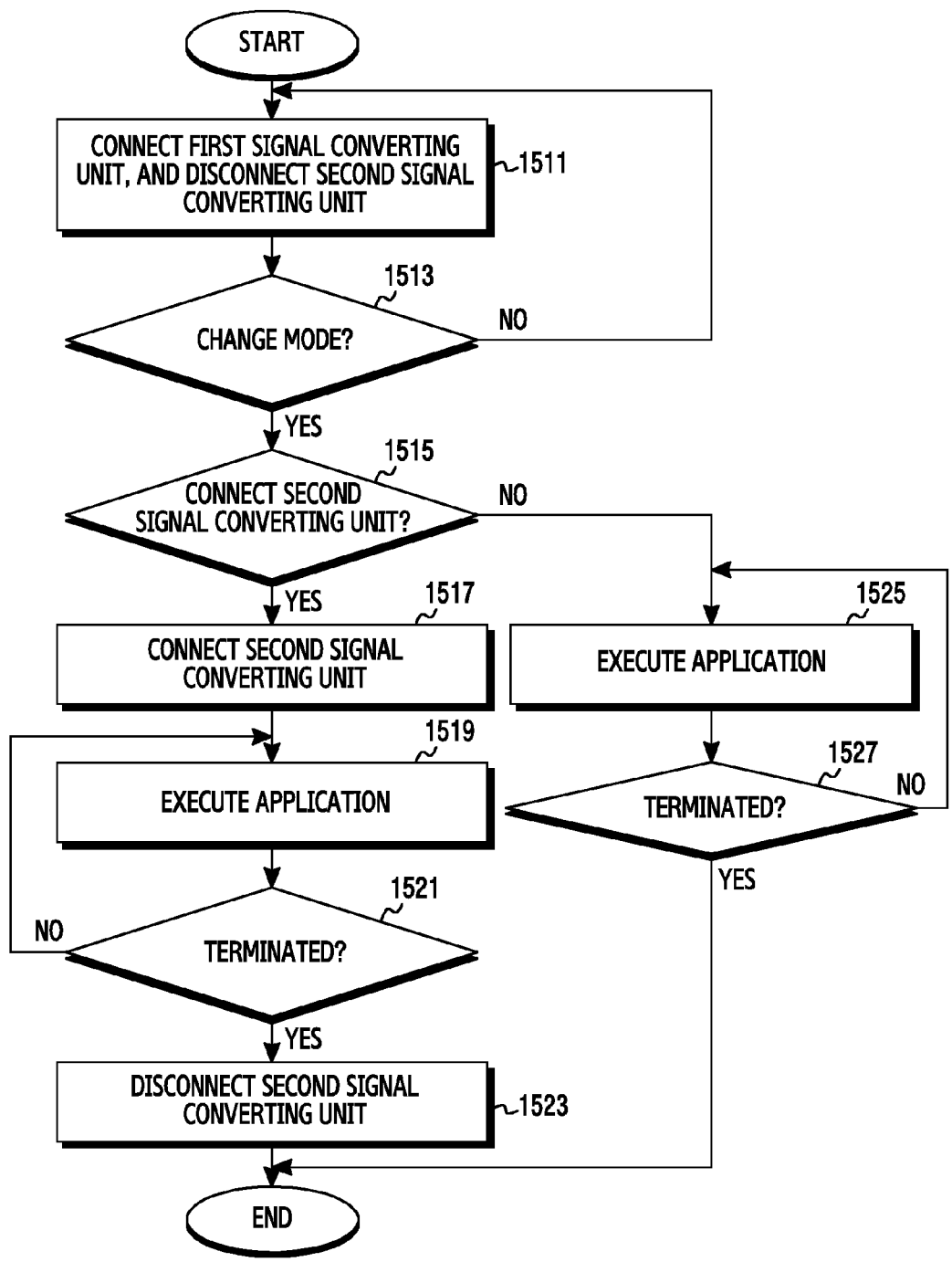
FIG. 15 is a flowchart illustrating an audio receiving method according to an embodiment of the present disclosure.

FIG. 15 is a flowchart illustrating an audio receiving method according to an embodiment of the present disclosure.

Referring to FIG. 15, in step 1511, an electronic device (e.g., the electronic device 400) connects the first signal converting unit 1023 (or the first signal converting unit 1123) to the audio processor 1040 (or the power supplying unit 1110). The electronic device may not connect the second signal converting unit 1025 (or the second signal converting unit 1125) to at least one of the audio processor 1040 and the power supplying unit 1110. For example, the electronic device may connect the second signal converting units 1025 and 1125 to the grounding devices 1033 and 1133, or may connect the second amplifiers 1043 and 1143 to the grounding devices 1033 and 1133, by using the switch devices 1031 and 1131 of the operation controllers 1030 and 1130.

Alternatively, the electronic device may disconnect the power supplying units 1010 and 1110 and the second signal converting units 1025 and 1125, by using the switch devices 1031 and 1131 included in the operation controllers 1030 and 1130. For example, the switch devices 1031 and 1131 of the operation controllers 1030 and 1130 may connect the power supplying units 1010 and 1110 to the grounding devices 1033 and 1133, or may connect the second signal converting units 1025 and 1125 to the grounding devices 1033 and 1133.

The electronic device (e.g., the processor 410) determines whether to convert a mode in step 1513. For example, the electronic device may determine the state information of the electronic device, or an application executed in the electronic device.

The electronic device may determine, by using the operation controllers 1030 and 1130, whether to connect the second signal converting units 1025 and 1125 in step 1515. The electronic device may determine, using the operation controllers 1030 and 1130, whether to connect the second signal converting units 1025 and 1125 with an audio processor or a power supplying unit based on the state information of the electronic device 400 or an application to be executed in the electronic device 400.

In step 1515, the electronic device determines that the second signal converting units 1025 and 1125 need to be connected to the audio processor 1040 (or the power supplying unit 1110).

In step 1517, the electronic device connects the second signal converting units 1025 and 1125 to the audio processor 1040 (or the power supplying unit 1110), by using the operation controllers 1030 and 1130. For example, the switch devices 1031 and 1131 of the operation controllers 1030 and 1130 may connect the second signal converting units 1025 and 1125 and the second amplifiers 1043 and 1143. Alternatively, the operation controllers 1030 and 1130 may connect the power supplying units 1010 and 1110 and the second signal converting units 1025 and 1125, between the power supplying units 1010 and 1110 and the second signal converting units 1025 and 1125. For example, the switch devices 1031 and 1131 of the operation controllers 1030 and 1130 may connect the power supplying units 1010 and 1110 and the second signal converting units 1025 and 1125.

The electronic device may execute an application in step 1519. In this case, the processor 410 may operate in the first sound quality mode or the first power mode (e.g., differential mode).

In step 1521, the electronic device detects whether the application is terminated.

When the electronic device determines that the application is terminated in step 1521, the electronic device disconnects the second signal converting units 1025 and 1125 and the audio processor 1040 (or the power supplying unit 1110) in step 1523. For example, the electronic device may disconnect the second signal converting units 1025 and 1125 and the audio processing units 1040 and 1140, using the operation controllers 1030 and 1130 between the second signal converting units 1025 and 1125 and the audio processors 1040 and 1140. For example, the electronic device may connect the second signal converting units 1025 and 1125 to the grounding devices 1033 and 1133, or may connect the second amplifiers 1043 and 1143 to the grounding devices 1033 and 1133, by using the switch devices 1031 and 1131 of the operation controllers 1030 and 1130. Alternatively, the electronic device may disconnect the power supplying units 1010 and 1110 and the second signal converting units 1025 and 1125, by using the operation controllers 1031 and 1131. For example, the electronic device may connect the power supplying units 1010 and 1110 to the grounding devices 1033 and 1133, or may connect the second signal converting units 1025 and 1125 to the grounding devices 1033 and 1133, by using the switch devices 1031 and 1131 of the operation controllers 1030 and 1130. Using the method above, the electronic device may terminate the audio receiving method.

When the electronic device determines that the application is not terminated in step 1521, the electronic device returns to step 1519. The electronic device may continuously execute an application in step 1519.

When it is determined that the second signal converting units 1025 and 1125 do not need to be connected, the electronic device may execute an application in step 1525. In this case, the electronic device may operate in the second sound quality mode or the second power mode (e.g., single-ended mode). For example, the audio detecting units 1021 and 1121 may vibrate based on the sound pressure of sound waves. In response to the vibration of the audio detecting units 1021 and 1121, a change in capacitance may be generated between the audio detecting units 1021 and 1121 and the first signal converting units 1023 and 1123. Accordingly, the first signal converting units 1023 and 1123 may detect a first audio signal from the change in capacitance. The converting units 1045 and 1145 may convert the first audio signal. The first amplifiers 1041 and 1141 may amplify the first audio signal. At least one of the second signal converting units 1025 and 1125 and the second amplifiers 1043 and 1143 may not be operated. Using the method above, an amount of power consumed in the audio converter 480 may be reduced.

In step 1527, the electronic device detects whether the application is terminated. When the electronic device determines that the application is terminated in step 1527, the electronic device may maintain the connection between the first signal converting unit 1023 (or the first signal converting unit 1123) and the audio processor 1040 (or the power supplying unit 1110). Also, the electronic device may maintain a disconnection between the second signal converting unit 1025 (or the second signal converting unit 1125) and at least one of the audio processor 1040 and the power supplying unit 1110. Using the method above, the electronic device may terminate the audio receiving method.

When the electronic device determines that the application is not terminated in step 1527, the electronic device returns to step 1525. The electronic device may continuously execute an application in step 1525.

According to various embodiments of the present disclosure, a method of transmitting or receiving an audio signal may include determining state information of the electronic device or an application executed in the electronic device and receiving or outputting an audio signal based on the state information or the application. The receiving or outputting operation includes receiving or outputting the audio signal based on a first mode when the state information is first state information or when the application is a first application and receiving or outputting the audio signal based on a second mode when the state information is second state information or when the application is a second application.

According to various embodiments of the present disclosure, a power consumption of the first mode exceeds a power consumption of the second mode. According to various embodiments of the present disclosure, the first mode is a differential mode, and the second mode is a single-ended mode.

According to various embodiments of the present disclosure, the state information includes a power state of the electronic device. The receiving or outputting operation includes determining the state information as the first state information when power of the electronic device is greater than or equal to a predetermined threshold value, and receiving or outputting the audio signal based on the first mode and determining the state information as the second state information when the power of the electronic device is less than the threshold value, and receiving or outputting the audio signal based on the second mode.

According to various embodiments of the present disclosure, the state information includes whether the electronic device is activated. The receiving or outputting operation includes determining the state information as the first state information when the electronic device is in an activated state, and receiving or outputting the audio signal based on the first mode and determining the state information as the second state information when the electronic device is in an deactivated state, and receiving or outputting the audio signal based on the second mode.

According to various embodiments of the present disclosure, the state information includes an execution state of the application. The receiving or outputting operation includes determining the state information as the first state information when the application is executed in the electronic device, and receiving or outputting the audio signal based on the first mode and determining the state information as the second state information when the application is not executed in the electronic device, and receiving or outputting the audio signal based on the second mode.

According to various embodiments of the present disclosure, the state information includes location information of the electronic device. The receiving or outputting operation includes determining the state information as the first state information when a location of the electronic device is a first location, and receiving or outputting the audio signal based on the first mode and determining the state information as the second state information when the location of the electronic device is a second location, and receiving or outputting the audio signal based on the second mode.

According to various embodiments of the present disclosure, the first application includes at least one of a voice recording application and a voice recognition application.

According to various embodiments of the present disclosure, the second application includes a voice wakeup application.

The term "module" as used herein may, for example, refer to a unit including one of hardware, software, and firmware or a combination of two or more. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present disclosure may include at least one of an application-specific integrated circuit (ASIC) chip, a field-programmable gate arrays (FPGA), and a programmable-logic device for performing operations which has been known or is to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which may be executed in a computer by using an interpreter, as well as machine codes made by a compiler. The aforementioned hardware device may be configured to operate as one or more software modules in order to perform the operations of the present disclosure, and vice versa.

The programming module according to an embodiment of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided to describe technical details of the present disclosure and to help in the understanding of the present disclosure, and do not limit the scope of the present disclosure.

The scope of the present disclosure should be construed as including all modifications or various other embodiments based on the technical idea of the present disclosure.

Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. A method of an electronic device including an audio converter including a first converter in an active state and a second converter in an inactive state, the method comprising:
    identifying a state of the electronic device associated with processing an audio signal;
    in response to identifying the state of the electronic device as a first state, switching the second converter from the inactivate state to an active state, and generating a first electronic signal based on a first signal converted from the audio signal by the first converter and a second signal converted from the audio signal by the second converter; and
    in response to identifying the state of the electronic device as a second state, maintaining the second converter in the inactive state, and generating a second electronic signal based on the first signal converted from the audio signal by the first converter.

2. The method of claim 1, wherein power consumption of the electronic device is greater when the second converter is in the active state than when the second converter is in the inactive state.

3. The method of claim 1, wherein sound quality of the first electronic signal is higher than sound quality of the second electronic signal.

4. The method of claim 1, wherein a remaining battery capacity of the electronic device is greater than or equal to designated amount in the first state, and
    wherein the remaining battery capacity of the electronic device is less than the designated amount in the second state.

5. The method of claim 1, wherein the electronic device operates in an active state in the first state, and
    wherein the electronic device operates in an inactive state in the second state.

6. The method of claim 1, wherein a first application is executed in the electronic device in the first state,
    wherein a second application is executed in the electronic device in the second state, and
    wherein the first application requires higher sound quality or power than the second application.

7. The method of claim 1, wherein the electronic device is located in a first location in the first state,
    wherein the electronic device is located in a second location in the second state, and
    wherein a level of noise occurring in the first location is greater than a level of noise occurring in the second location.

8. The method of claim 1, wherein switching the second converter from the inactivate state to the active state comprises connecting circuitry to which the second converter is connected.

9. The method of claim 1, wherein generating the first electronic signal comprises removing noise from the audio signal based on a phase difference between the first signal and the second signal.

10. An electronic device, comprising:
    a speaker;
    an audio converter including a first converter in an activate state and a second converter in an inactive state; and
    one or more processors, operably coupled to the audio converter, configured to:
        identify a state of the electronic device,
        in response to identifying the state of the electronic device as a first state, control to switch the second converter from the inactive state to an activate state, control to generate a first audio signal based on a first signal converted from an electronic signal by the first converter and a second signal converted from the electronic signal by the second converter, and control to output the first audio signal via the speaker, and
        in response to identifying the state of the electronic device as a second state, control to maintain the second converter in the inactive state, control to generate a second audio signal based on the first signal converted from the electronic signal by the first converter, and control to output the second audio signal via the speaker.

11. An electronic device, comprising:
    an audio converter including a first converter in an active state and a second converter in an inactive state; and
    one or more processors, operably coupled to the audio converter, configured to:
        identify a state of the electronic device associated with processing an audio signal;
        in response to identifying the state of the electronic device as a first state, control to switch the second converter from the inactive state to an active state, and control to generate a first electronic signal based on a first signal converted from the audio signal by the first converter and a second signal converted from the audio signal by the second converter; and
        in response to identifying the state of the electronic device as a second state, control to maintain the second converter in the inactive state, and control to generate a second electronic signal based on the first signal converted from the audio signal by the first converter.

12. The electronic device of claim 11, wherein power consumption of the electronic device is greater when the second converter is in the active state than when the second converter is in the inactive state.

13. The electronic device of claim 11, wherein sound quality of the first electronic signal is higher than sound quality of the second electronic signal.

14. The electronic device of claim 11, wherein the electronic device operates in an active state in the first state, and
    wherein the electronic device operates in an inactive state in the second state.

15. The electronic device of claim 11, wherein a remaining battery capacity of the electronic device is greater than or equal to designated amount in the first state, and
    wherein the remaining battery capacity of the electronic device is less than the designated amount in the second state.

16. The electronic device of claim 11, wherein the electronic device is located in a first location in the first state,
    wherein the electronic device is located in a second location in the second state, and
    wherein a level of noise occurring in the first location is greater than a level of noise occurring in the second location.

17. The electronic device of claim 11, wherein a first application is executed in the electronic device in the first state,
- wherein a second application is executed in the electronic device in the second state, and
- wherein the first application requires higher sound quality or higher power than the second application.

18. The electronic device of claim 11, further comprising a switch,
- wherein the one or more processors are configured to control the switch to connect circuitry to which the second converter is connected, in response to identifying the state of the electronic device as the first state.

19. The electronic device of claim 18, wherein the switch is disposed between a power supply and the second converter, or is disposed between the second converter and an amplifier for the second converter.

20. The electronic device of claim 11, wherein the one or more processors are configured to remove a noise from the audio signal based on a phase difference between the first signal and the second signal, in response to identifying the state of the electronic device as the first state.

\* \* \* \* \*